US012026117B2

(12) United States Patent
Yamashita et al.

(10) Patent No.: US 12,026,117 B2
(45) Date of Patent: Jul. 2, 2024

(54) DATA TRANSFER SYSTEM BETWEEN SYSTEM HOST AND LOCAL DEVICE THROUGH ADAPTOR

(71) Applicant: PANASONIC INTELLECTUAL PROPERTY MANAGEMENT CO., LTD., Osaka (JP)

(72) Inventors: Hideaki Yamashita, Kyoto (JP); Takeshi Ootsuka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 17/604,197

(22) PCT Filed: Aug. 25, 2020

(86) PCT No.: PCT/JP2020/032022
§ 371 (c)(1),
(2) Date: Oct. 15, 2021

(87) PCT Pub. No.: WO2021/075154
PCT Pub. Date: Apr. 22, 2021

(65) Prior Publication Data
US 2022/0188259 A1 Jun. 16, 2022

(30) Foreign Application Priority Data
Oct. 16, 2019 (JP) .................................. 2019-189412

(51) Int. Cl.
*G06F 13/40* (2006.01)
*G06F 1/3225* (2019.01)

(52) U.S. Cl.
CPC ........ *G06F 13/4081* (2013.01); *G06F 1/3225* (2013.01)

(58) Field of Classification Search
CPC .. G06F 13/4081; G06F 13/409; G06F 13/382; G06F 13/385; G06F 13/387;
(Continued)

(56) References Cited

U.S. PATENT DOCUMENTS 6,505,258 B1 * 1/2003 Sakarda ................ G06F 1/1632
711/115
10,565,147 B2 * 2/2020 Yamashita .......... G06F 13/4022
(Continued)

FOREIGN PATENT DOCUMENTS

JP 2003-335028 A 11/2003
JP 2019-028513 A 2/2019

OTHER PUBLICATIONS

International Preliminary Report on Patentability dated Apr. 28, 2022 issued in International Patent Application No. PCT/JP2020/032022, with English translation.
(Continued)

*Primary Examiner* — Raymond N Phan
(74) *Attorney, Agent, or Firm* — Rimon PC

(57) ABSTRACT

A data transfer system, which comprises a system host and an adaptor including a local host, is provided. The adaptor is connectable to a local device inserted into the adaptor and includes a switch unit configured to perform address translation and Requestor (Req) ID translation for data transfers between the local device and the system host. The system host checks, when the local device is inserted or removed while the system host is in operation, a type of a protocol applied to the local device and reloads a device driver based on a result of the check. The device driver includes a pre-sleep state storage configured to store an insertion and removal state of the local device immediately before the system host and the adaptor enter a sleep state.

12 Claims, 13 Drawing Sheets

(58) Field of Classification Search
CPC ............ G06F 13/4063; G06F 13/4068; G06F 1/1626; G06F 1/1632; G06F 1/185; G06F 1/3203; G06F 1/3215; G06F 1/3231; G06F 1/3234; G06F 1/3287; G06F 1/32; G06F 1/3293; G06F 9/4433
See application file for complete search history.

(56) References Cited

U.S. PATENT DOCUMENTS

| | | | |
|---|---|---|---|
| 11,132,308 B2* | 9/2021 | Lee | G06F 13/28 |
| 2003/0101312 A1 | 5/2003 | Doan et al. | |
| 2005/0246556 A1* | 11/2005 | Oshins | G06F 1/3203 |
| | | | 713/300 |
| 2007/0260358 A1 | 11/2007 | Katoh | |
| 2009/0217026 A1* | 8/2009 | Chuang | G06F 1/3203 |
| | | | 713/100 |
| 2014/0143572 A1 | 5/2014 | Horiuchi et al. | |
| 2020/0225961 A1* | 7/2020 | Inagaki | G06F 9/4418 |

OTHER PUBLICATIONS

Extended European Search Report dated Jan. 31, 2023 issued in the corresponding European Patent Application No. 20876374.8.
International Search Report issued in International Application No. PCT/JP2020/032022, dated Nov. 10, 2020 w/Machine English Translation.

* cited by examiner

[FROM A STATE OF NO CARD INSERTED TO A STATE OF A CARD INSERTED WHILE IN SLEEP STATE]

[FROM A STATE OF A CARD INSERTED TO A STATE OF THE CARD REMOVED WHILE IN SLEEP STATE]

DATA TRANSFER SYSTEM BETWEEN SYSTEM HOST AND LOCAL DEVICE THROUGH ADAPTOR

CROSS REFERENCE TO RELATED APPLICATIONS

This application is the U.S. National Phase under 35 U.S.C. § 371 of International Application No. PCT/JP2020/032022, filed on Aug. 25, 2020, which claims the benefit of Japanese Application No. 2019-189412, filed on Oct. 16, 2019, the entire contents of each are hereby incorporated by reference.

TECHNICAL FIELD

The present disclosure relates to a data transfer system that transfers data between a system host and a local device via an adaptor.

BACKGROUND ART

PCI Express (registered trademark) (hereinafter, referred to as PCIe) is applied, as a high-speed serial interface, to various electronic devices such as a personal computer.

For example, PCIe is further applied to a system including a video server serving as a system host and a memory card serving as a local device.

PRIOR ART DOCUMENT

Patent Document

Patent Document 1: JP 2019-28513A

SUMMARY OF THE INVENTION

Problem to be Solved by the Invention

In such a data transfer system, however, an insertion and removal state of the local device with respect to an adaptor may variously change.

The present disclosure provides, in such a data transfer system, a system host capable of suitably transmitting and receiving data to and from a local device or an adaptor after returning from a sleep state even when an insertion and removal state of the local device with respect to the adaptor changes while the system host is in the sleep state. The present disclosure further provides a data transfer system including such a system host.

Means for Solving Problem

A data transfer system according to the present disclosure includes a system host and an adaptor including a local host. In the data transfer system, the adaptor is connectable to a local device inserted into the adaptor and includes a switch unit configured to perform address translation and Requestor (Req) ID translation for data transfers between the local device and the system host, the system host checks, when the local device is inserted or removed while the system host is in operation, a type of a protocol applied to the local device and reloads a device driver based on a result of the check, and the device driver includes a pre-sleep state storage configured to store an insertion and removal state of the local device immediately before the system host and the adaptor enter a sleep state.

Effect of the Invention

In the data transfer system according to the present disclosure, the system host is capable of suitably transmitting and receiving data to and from the local device or the adaptor after returning from the sleep state even when the insertion and removal state of the local device with respect to the adaptor changes while the system host is in the sleep state.

MODES FOR CARRYING OUT THE INVENTION

Embodiments will be described in detail below with appropriate reference to the drawings. However, a detailed description more than necessary may be omitted. For example, a detailed description of a well-known matter and a redundant description on substantially the same structure may be omitted. This is to avoid the following description being unnecessarily redundant and to help those skilled in the art to easily understand the following description.

Note that the inventor(s) provides the accompanying drawings and the following description to help those skilled in the art to fully understand the present disclosure, and do not intend to use the accompanying drawings and the following description to limit the subject matter of the claims.

1. Background to Embodiments

Figure 13:
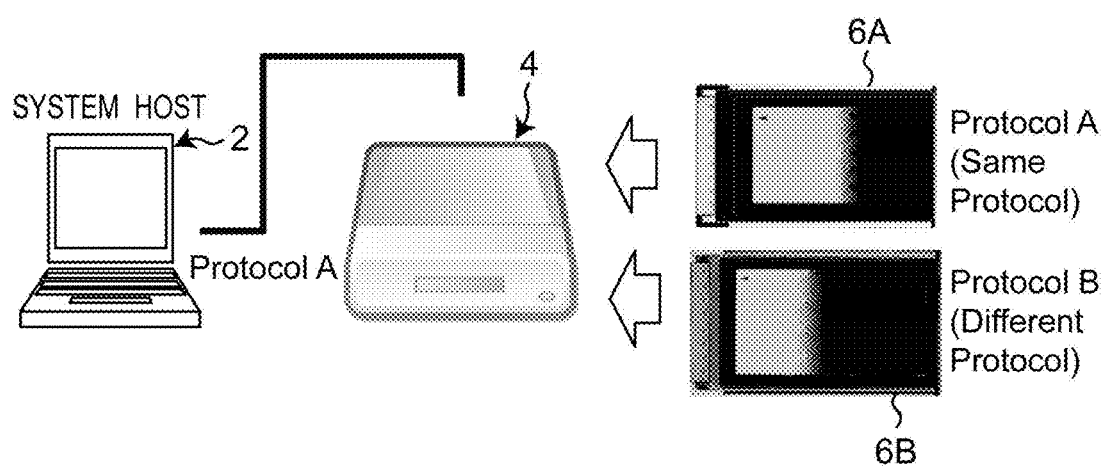
FIG. 13 is a diagram schematically showing the data transfer system according to the present disclosure.

FIG. 13 is a schematic structure diagram of a data transfer system that transfers data between a system host 2 and a local device 6A, 6B via an adaptor 4. To such a data transfer system, PCIe is often applied as a high-speed serial interface.

In the data transfer system shown in FIG. 13, the adaptor 4 may be compatible with a protocol (Protocol A in FIG. 13) between the system host (host device) 2 and the adaptor 4, the local device 6A to which the same protocol is applied, and the local device 6B to which a different protocol (Protocol B in FIG. 13) is applied. While such a data transfer system is in operation, when the local device 6A, 6B is inserted or removed, the system host 2 checks, as needed, the type of a protocol applied to a corresponding local device 6 and reloads a corresponding device driver based on the type of the protocol to change the function of the system host 2.

In the data transfer system shown in FIG. 13, however, the system host 2 may temporarily enter a sleep state such as a power saving mode. When the local device 6A, 6B is inserted into the adaptor 4 in a state where the adaptor 4 has none of the local devices 6A, 6B inserted while the system host 2 is in the sleep state, immediately after the system host 2 returns from the sleep state, the device driver is kept in a state immediately before the sleep state. The device driver at this time is a driver for the adaptor 4 having none of the local devices 6A, 6B inserted. This prevents the system host 2 from accessing the local device 6A, 6B inserted into the adaptor 4 without delay.

Likewise, when the local device 6A, 6B is removed from the adaptor 4 in a state where the adaptor 4 has a corresponding one of the local devices 6A, 6B attached (that is, inserted) while the system host 2 is in the sleep state, immediately after the system host 2 returns from the sleep state, the device driver is kept in a state immediately before the sleep state. The device driver at this time is a driver for the adaptor 4 having the local device 6A, 6B inserted and a corresponding one of the local devices 6A, 6B inserted into the adaptor 4. This prevents the system host 2 from fully accessing the adaptor 4 without delay.

Such problems tend to clearly appear in a structure where the adaptor 4 operates in conjunction with the system host 2 on the same power supply.

The embodiments according to the present disclosure are intended to solve the problems. According to the embodiments of the present disclosure, a device driver of a system host includes a pre-sleep state storage. This allows the system host to suitably transmit and receive data to and from a local device or an adaptor after returning from a sleep state even when an insertion and removal state of the local device with respect to the adaptor changes while the system host and the adaptor are in the sleep state.

Note that a description will be given, in the following embodiments, of a system using PCIe as an example, but, as for a local device including a PCI bus based on a similar technique, a technique according to the following embodiments is applicable to also a system responsible for converting between PCIe and PCI in an adaptor.

2. First Embodiment

The first embodiment will be described below with reference to FIGS. 1 to 6.

2.1 Structure

Figure 1:
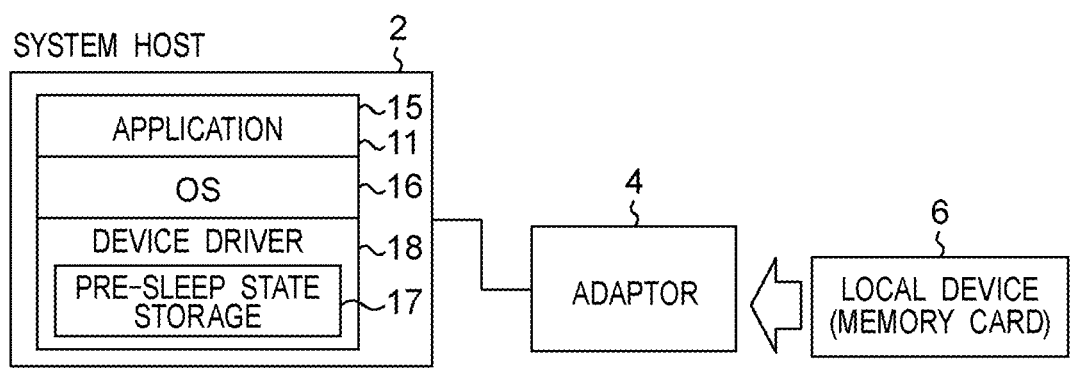
FIG. 1 is a diagram schematically showing a structure of a data transfer system according to a first embodiment.

2.1.1. Technical Features of Data Transfer System According to First Embodiment FIG. 1 is a diagram schematically showing a structure of a data transfer system according to the first embodiment. The data transfer system transfers data between a system host 2 and a local device (memory card) 6 via an adaptor 4. The system host 2 is also referred to as a host device or the like and is typically made up of a personal computer. The adaptor 4 is also referred to as a reader/writer, a drive, or the like.

In the system host 2, an operating system (OS) 16, applications 11, 15, a device driver 18, and the like are run on the CPU. Further, in the system host 2 according to the first embodiment, the device driver 18 includes a pre-sleep state storage 17. The pre-sleep state storage 17 stores an insertion and removal state of the local device 6 immediately before the system host 2 and the adaptor 4 enter a sleep state corresponding to a power saving mode. When the insertion and removal state of the local device 6 has changed at the time when the system host 2 and the adaptor 4 return from the sleep state, the system host 2 reloads the device driver 18.

Here, the reason why the system host 2 reloads the device driver 18 is as follows. In general, the device driver 18 passes, to the OS 16, various parameters and the like, and the OS 16 receives the parameters and the like and runs in accordance with the parameters and the like. The OS 16 can receive, under normal conditions, the parameters and the like from the device driver 18 only at the time of initialization of the device driver 18. It is therefore required that the device driver 18 be reloaded when the insertion and removal state of the local device 6 with respect to the adaptor 4 changes.

2.1.2. Structure of Data Transfer System According to First Embodiment

Figure 2:
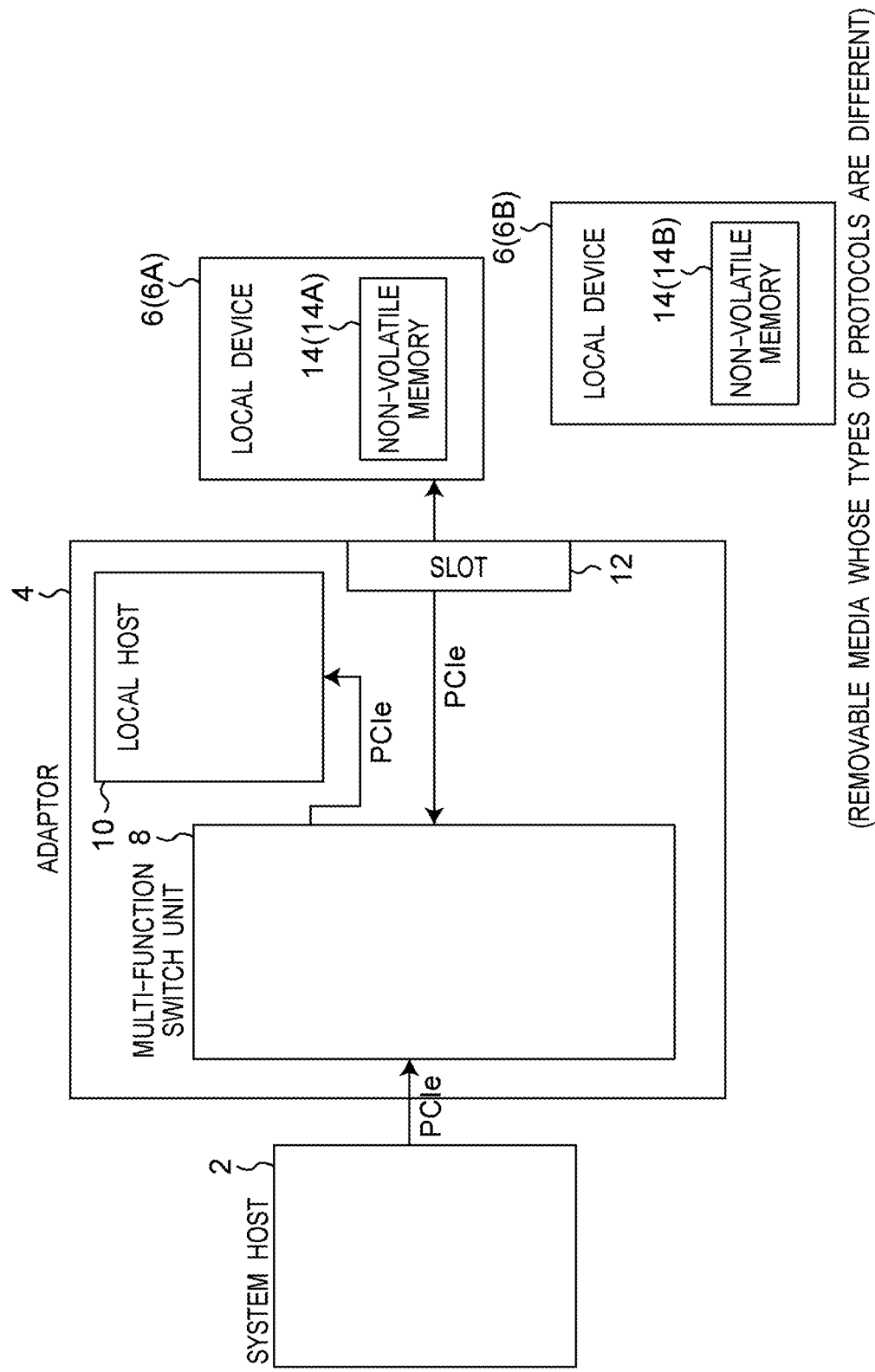
FIG. 2 is a schematic block diagram of the data transfer system according to the first embodiment.

FIG. 2 is a schematic block diagram of the data transfer system according to the first embodiment. FIG. 2 shows the data transfer system in which the system host 2, the adaptor 4 including a local host 10, and the local device 6 (6A, 6B) including a non-volatile memory 14 (14A, 14B) are connected via a PCIe bus and a slot 12. The local host 10 may be provided either inside or outside the adaptor 4, or may be provided inside a multi-function switch unit 8 to be described later. The local device 6 (6A, 6B) is, for example, a removable medium and is not limited to a medium to which any specific protocol is applied. Further, herein, the local device 6 (6A, 6B) may be simply referred to as a "card" or a "memory card".

Figure 3:
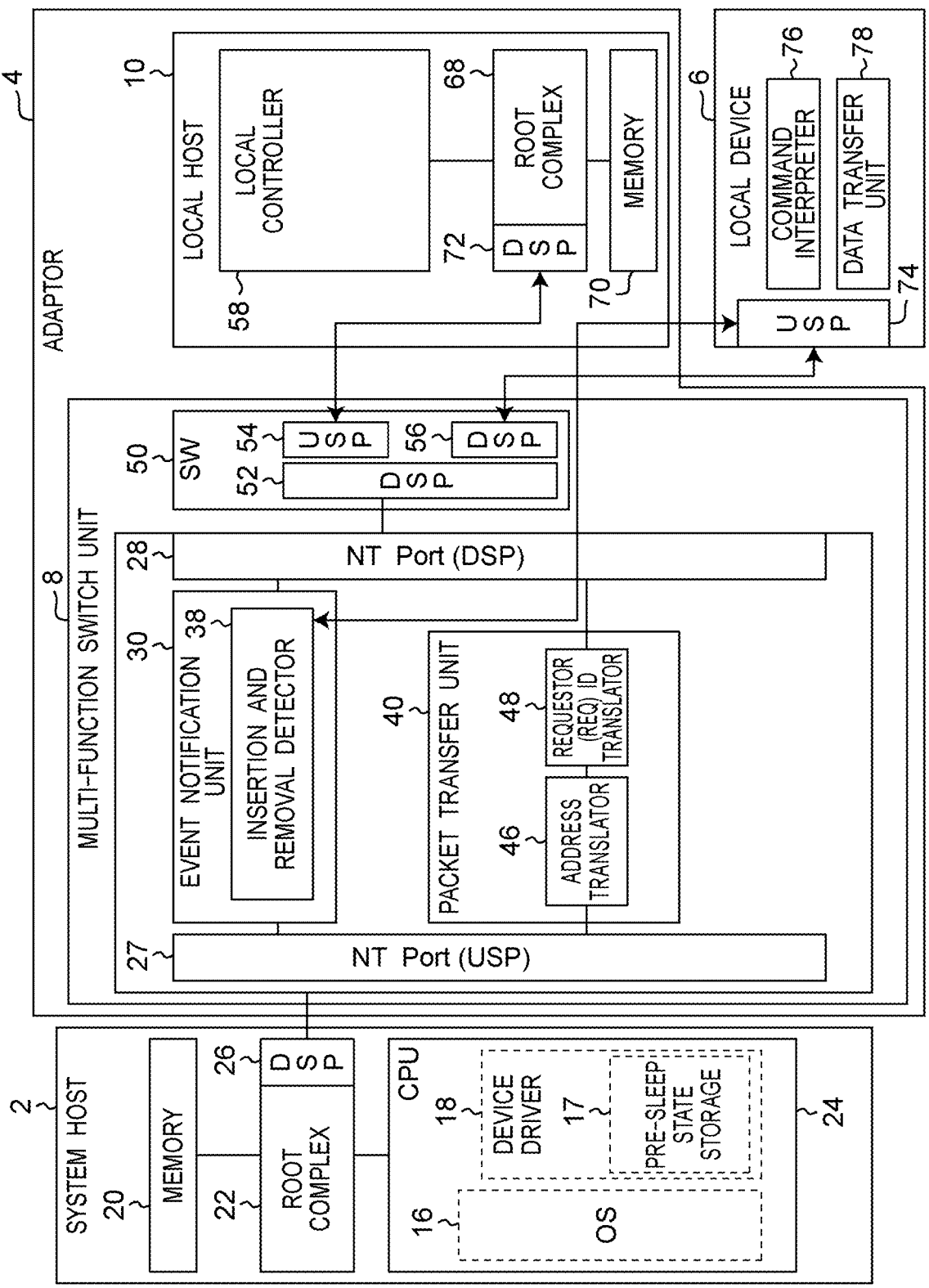
FIG. 3 is a detailed block diagram of the data transfer system according to the first embodiment.

2.1.3. Detailed Structure of Data Transfer System According to First Embodiment FIG. 3 is a detailed block diagram of the data transfer system according to the first embodiment. First, the system host 2 includes a memory 20 serving as a primary memory, a CPU (processor) 24, and a root complex 22. The root complex 22 is a device serving as a root of a PCIe tree. The root complex 22 includes a down stream port (DSP) 26 serving as a port directed toward a terminal. Note that an up stream port (USP) is a port directed upstream (toward the CPU) from the terminal side.

The OS 16 and the device driver 18 are loaded into the memory 20 to run on the CPU (processor) 24 as needed.

The local device 6 includes a command interpreter 76, a data transfer unit 78, and a USP 74. Upon receipt of a data transfer command, the command interpreter 76 interprets the data transfer command and performs a process in accordance with the command. The data transfer unit 78 performs a data transfer over the PCIe bus when the command interpretation made by the command interpreter 76 results in a command for performing a process including a data transfer.

The multi-function switch unit 8 included in the adaptor 4 includes a non-transparent (NT) port (USP) 27, an NT port (DSP) 28, an event notification unit 30, a packet transfer unit 40, and a PCIe switch 50.

The PCIe system typically has a tree structure with the root complex serving as a root. All devices connected to the PCIe are accessible from the root complex. The PCIe system is, however, not allowed to either separate domains for each host or device or provide a plurality of routes (complexes). Therefore, causing the multi-function switch unit 8, which is a switch, to serve as an endpoint device makes it possible to implement a form where the domains of the two hosts (the system host and the local host) connected to the switch are separated. In order to implement the form, the NT ports (the NT port (USP) 27 and the NT port (DSP) 28) are provided.

Further, the system host 2 and the local host 10 each including the root complex are connected via the PCIe switch 50 and the NT ports (27, 28), so as to allow communication with the system domains separated. As shown in FIG. 3, the PCIe switch 50 includes a USP 54, a DSP 56, and a DSP 52. The USP 54 is a port directed upstream (that is, toward the local host 10) from the terminal side. The DSP 56 is a port directed toward the terminal (that is, toward the local device 6). The DSP 52 is a port directed toward the terminal (that is, toward a main body of the multi-function switch unit 8). The PCIe switch 50 acts to cause the multi-function switch unit 8, which is a switch, to serve as an endpoint device.

The event notification unit 30 includes a plurality of control registers (not shown) and an insertion and removal detector 38. The plurality of control registers (not shown) are communication-use registers accessible from the system host 2 and the local host 10 and have registers and memory areas for use in exchanging messages between the system host 2 and each of the plurality of control registers and between the local host 10 and each of the plurality of control registers. The control registers (not shown) are used to register a request command directed from the system host 2 to the adaptor 4 or to notify the system host 2 of command completion from the adaptor 4. The insertion and removal detector 38 monitors a signal line indicating whether the local device 6 is inserted into or removed from the slot 12 and issues, when a state changes, an interrupt to the local host 10 or the system host 2.

The packet transfer unit 40 includes an address translator 46 and a Requestor (Req) ID translator 48. When data is transferred from the system host 2 to the local host 10, the address translator 46 translates an address assigned to the system host 2 into an address assigned to the local host 10 based on a table (address translation table) where correspondences between an address space system on the system host 2 and an address space system on the local host 10 are defined. Further, the same applies when data is transferred from the local host 10 to the system host 2. When a Requestor performs a transfer from the system host 2 to the local host 10, the Requestor (Req) ID translator 48 translates a ReqID assigned to the system host 2 into a ReqID assigned to the local host 10 based on a table (ReqID translation table) where correspondences between a Requestor ID (ReqID) system on the system host 2 and a Requestor ID (ReqID) system on the local host 10 are defined, the Requester ID (ReqID) being composed of a bus number, a device number, and a function number. Further, the same applies when a Requestor performs a transfer from the local host 10 to the system host 2.

The local host 10 included in the adaptor 4 in the structure shown in FIG. 3 includes a local controller 58, a root complex 68, and a memory 70 serving as a primary memory.

The local controller 58 is configured to, for example:
(1) initialize a configuration space of the local device 6 to make the local device 6 operable;
(2) read a configuration register of the local device 6 and determine a type of the local device 6 to switch a subsequent process to a process for each device;
(3) acquire an address system on the system host 2 and an address system on the local host 10 and register correspondences between addresses into the address translation table of the address translator 46 of the packet transfer unit 40; and
(4) obtain a ReqID assigned to the system host 2 and a ReqID assigned to the local host 10 and register correspondences between the ReqIDs into the Requestor (Req) ID translation table of the Requestor (Req) ID translator 48 of the packet transfer unit 40.

In such a data transfer system, as described above, when the local device 6 is inserted or removed while the system host 2 is in operation, the system host 2 checks the type of a protocol applied to the local device 6 and reloads the device driver 18 based on a result of the check to change a function of the system host.

The device driver 18 further includes the pre-sleep state storage 17. As described above, the pre-sleep state storage 17 stores the insertion and removal state of the local device 6 immediately before the system host 2 and the adaptor 4 enter the sleep state corresponding to the power saving mode. Even when the insertion and removal state of the local device 6 has changed at the time when the system host 2 and the adaptor 4 return from the sleep state, the system host 2 reloads the device driver 18.

Figure 4:
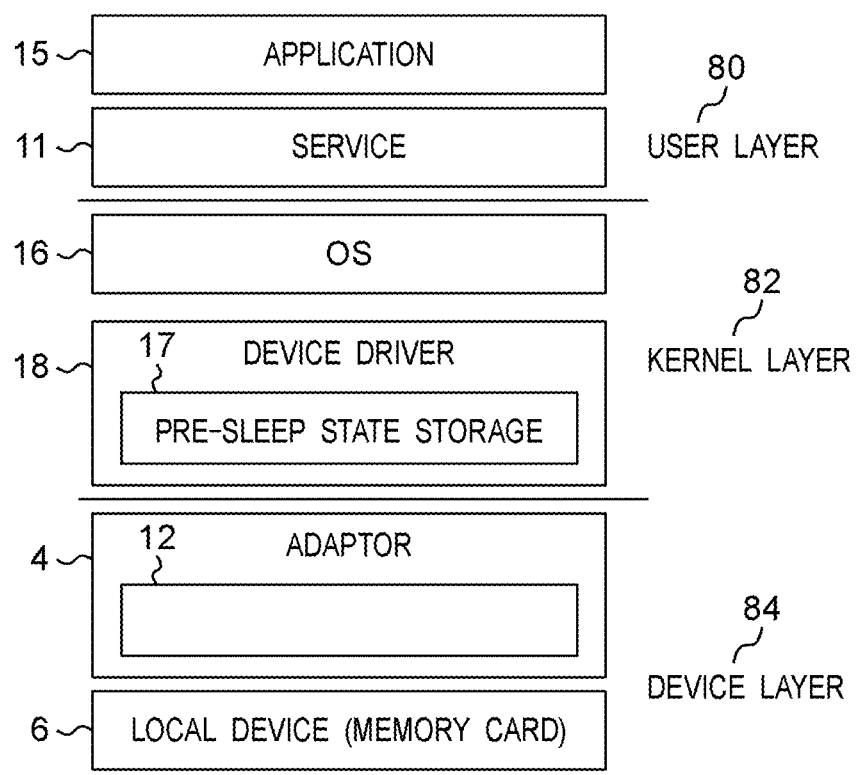
FIG. 4 is a diagram schematically showing a hierarchical structure of the data transfer system according to the first embodiment.

2.1.4. Hierarchical Structure of Data Transfer System According to First Embodiment FIG. 4 is a diagram schematically showing a hierarchical structure of the data transfer system according to the first embodiment. The hierarchical structure of the data transfer system includes a user layer 80, a kernel layer 82, and a device layer 84. The user layer 80 and the kernel layer 82 are implemented by the system host (host device) 2. The device layer 84 is implemented by the adaptor 4 and the local device 6.

The user layer 80 is implemented by the application 15 and a service 11. The service 11 is a type of resident application.

The kernel layer 82 is implemented by the OS 16 and the device driver 18. The device driver 18 in the system host 2 according to the present embodiment further includes the pre-sleep state storage 17.

The device layer 84 is implemented by the adaptor 4 and the local device (memory card) 6.

2.2. Operation

Figure 5:
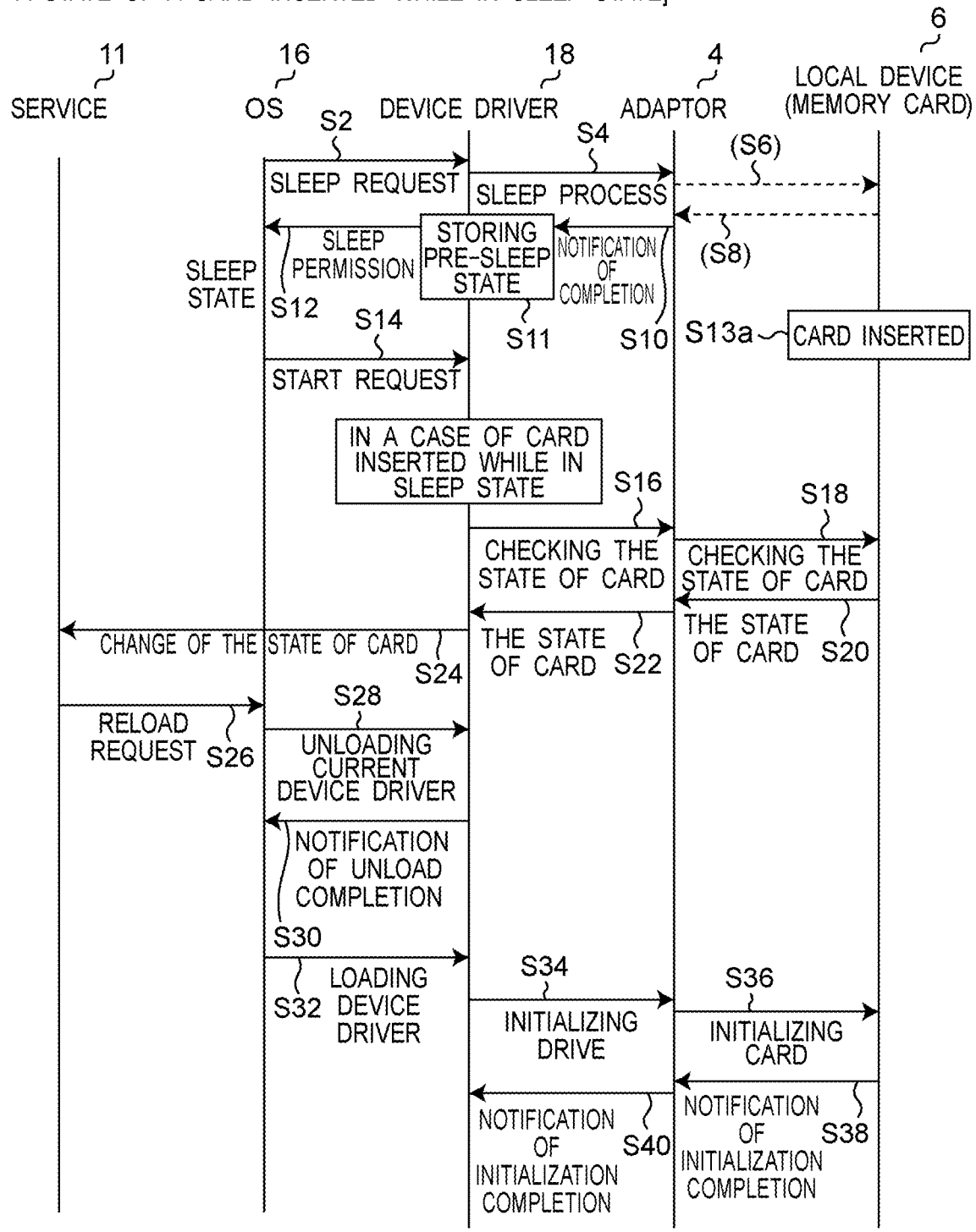
FIG. 5 is a first sequence diagram showing how the data transfer system according to the first embodiment operates.
Figure 6:
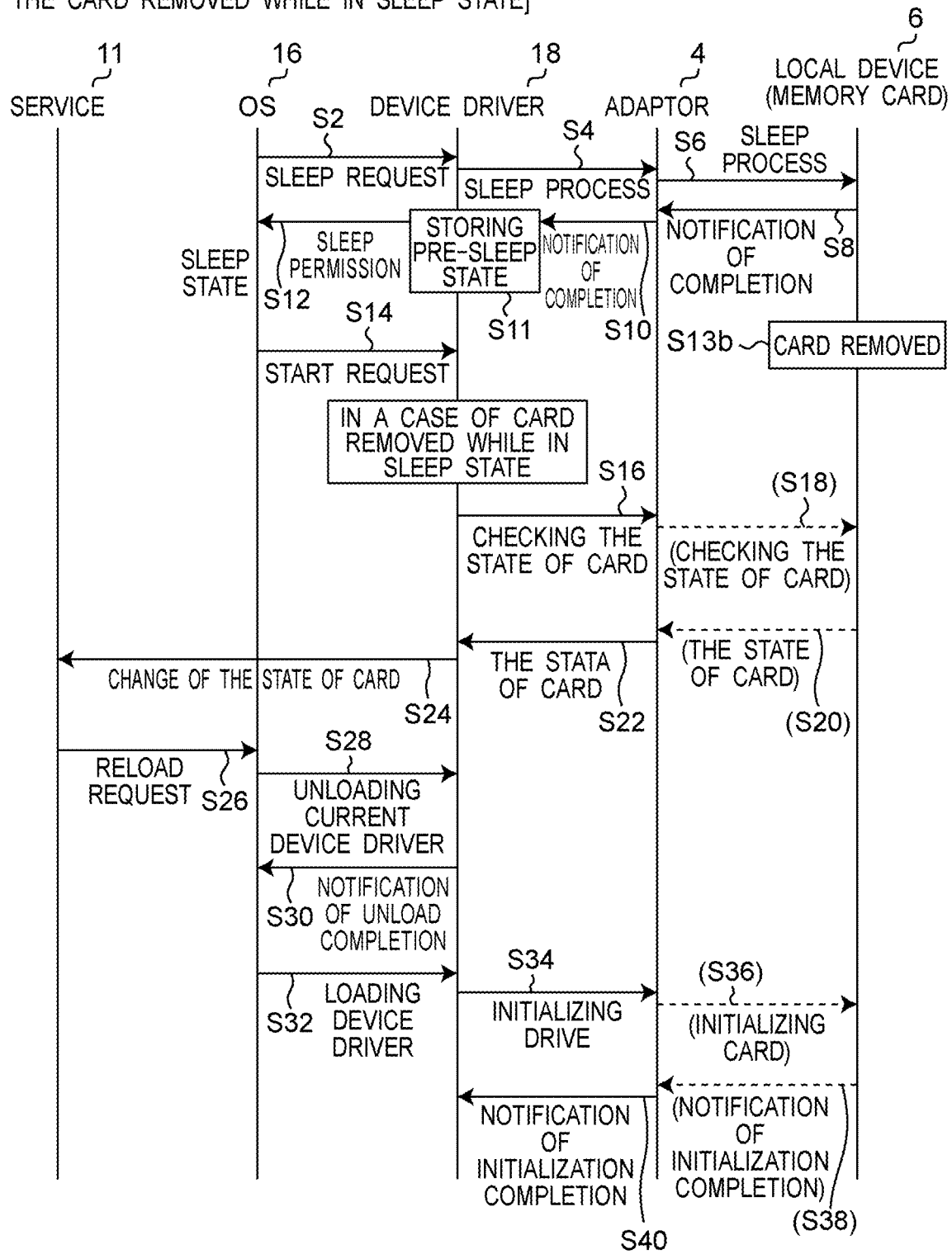
FIG. 6 is a second sequence diagram showing how the data transfer system according to the first embodiment operates.

FIGS. 5 and 6 are a first sequence diagram and a second sequence diagram, respectively, for specifically describing the operation of the data transfer system according to the first embodiment including the system host 2 using the device driver 18 including the pre-sleep state storage 17.

According to the first embodiment, the OS 16 and the device driver 18 reside in the system host 2. The OS 16 manages and controls the entire system host 2. The device driver 18 controls devices connected to the system host 2 such as the adaptor 4 and the local device 6. The service 11 is a type of resident application.

2.2.1. Sequence When Local Device is Inserted in Sleep State

FIG. 5 is the first sequence diagram showing how the data transfer system operates when a change from a state where no local device 6 has been inserted into the adaptor 4 to a state where the local device 6 has been inserted into the adaptor 4 has occurred while the system host 2 and the adaptor 4 are in the sleep state. First, when the system host 2 and the adaptor 4 enter the sleep state such as the power saving mode, the OS 16 issues a sleep request to the device driver 18 (S2).

Note that the device driver 18 thus prepared is typically a single type of program. Such a device driver 18 of a single type is initialized for the adaptor 4 having no local device 6 inserted or initialized for the adaptor 4 having the local device 6 inserted, and runs on the CPU 24. In step S2, the device driver 18 that receives the sleep request from the OS 16 is initialized for the adaptor 4 having no local device 6 inserted.

In response to the sleep request in step S2, the device driver 18 performs a sleep process on the adaptor 4 (S4). Examples of the sleep process include a process where the device driver 18 instructs, via the adaptor 4, the local device 6 to flush a buffer memory holding unwritten data.

Since no local device 6 has been inserted at this point of time, the adaptor 4 performs neither a sleep process on the local device 6 (see S6) nor a response process (that is, a sleep completion notification process) (see S8).

The adaptor 4 notifies the device driver 18 of the completion of the sleep process (S10), and in response to the notification, the device driver 18 causes the pre-sleep state storage 17 to store a pre-sleep state, that is, a state where no local device 6 has been inserted (S11).

The process of storing the pre-sleep state (S11) is specifically as follows. Specifically, the pre-sleep state storage 17 is a variable that belongs to the device driver 18. In fact, contents in the pre-sleep state storage 17 are stored in a DRAM included in the system host 2. When entering the sleep state, the system host 2, and the adaptor 4 and the local device 6 that are power-controlled in synchronization with the system host 2 are powered off. Note that the OS 16 of the system host 2 saves (that is, records) a snapshot of the memory (DRAM) before entering the sleep state on a non-volatile storage such as an HDD or an SSD. This in turn saves the contents stored in the pre-sleep state storage 17 on such a non-volatile storage.

Note that when returning from the sleep state, the contents saved on the non-volatile storage are restored onto the DRAM by the OS 16. Accordingly, after returning from the sleep state, the device driver 18 can grasp the pre-sleep state by consulting the pre-sleep state storage that is a variable restored onto the DRAM.

After the process of storing the pre-sleep state in step S11, the device driver 18 notifies the OS 16 of a sleep permission (S12) to bring the OS 16 into the sleep state.

While the system host 2 and the adaptor 4 are in the sleep state, the local device 6 is inserted into the adaptor 4 by a system operator or the like (S13a).

When the system host 2 and the adaptor 4 return from the sleep state, the OS 16 issues a start request to the device driver 18 (S14). The device driver 18 instructs, in response to the start request, the adaptor 4 to check the state of the card (local device) 6 (S16), and the adaptor 4 checks, in response to the instruction, whether or not the card (local device) 6 is inserted (S18).

As shown in the sequence diagram in FIG. 5, since the card (local device) 6 is inserted, the adaptor 4 determines that the card (local device) 6 is inserted (S20). At this time, it is preferable that the adaptor 4 grasp data such as the type, protocol, and identification number of the local device 6 together with the insertion state. The adaptor 4 returns, to the device driver 18, a response indicating that the card (local device) 6 is inserted (S22).

Here, the device driver 18 determines that the state of the card (local device) 6 in the adaptor 4 has changed from the non-insertion state to the insertion state based on the contents stored in the pre-sleep state storage 17 and the contents of the response from the adaptor 4. The device driver 18 provides, to the service 11, notification of the change from the non-insertion state to the insertion state of the card (local device) 6 (S24). Note that this "notification of the change from the non-insertion state to the insertion state" is typically provided to respond to polling made by the service 11.

In response to the "notification of the change from the non-insertion state to the insertion state", the service 11 issues a reload request to the OS 16 to reload the device driver 18 (S26).

In response to the reload request to reload the device driver 18, the OS 16 first unloads the current device driver 18 initialized for the adaptor 4 having no local device 6 inserted (S28), and the OS 16 is noticed of the completion of the unloading (S30). Subsequently, the OS 16 loads the device driver 18 initialized for the adaptor 4 having the local device 6 inserted (S32). The device driver 18 thus loaded initializes the drive (adaptor) 4 (S34). Then, the adaptor 4 initializes the inserted card (local device) 6 (S36). The completion of the initialization of the card (local device) 6 is notified to the adaptor 4 (S38) and further notified to the device driver 18 (S40).

2.2.2. Sequence when Local Device is Removed in Sleep State

FIG. 6 is the second sequence diagram showing how the data transfer system operates when a change from the state where the local device 6 has been inserted into the adaptor 4 to the state where no local device 6 has been inserted into the adaptor 4, that is, the local device 6 has been removed from the adaptor 4, has occurred while the system host 2 and the adaptor 4 are in the sleep state. First, when the system host 2 and the adaptor 4 enter the sleep state such as the power saving mode, the OS 16 issues the sleep request to the device driver 18 initialized for the adaptor 4 having the local device 6 inserted (S2). In response to the sleep request, the device driver 18 performs the sleep process on the adaptor 4 (S4). The example of the sleep process on the adaptor 4 has been described above.

At this point of time, the local device 6 has been inserted, and the adaptor 4 performs the sleep process on the local device 6 (S6). The local device 6 notifies the adaptor 4 of the completion of the sleep process (S8).

The adaptor 4 notifies the device driver 18 of the completion of the sleep process (S10), and in response to the notification, the device driver 18 causes the pre-sleep state storage 17 to store the pre-sleep state, that is, the state where the local device 6 has been inserted (S11). At this time, it is preferable that the pre-sleep state storage 17 store data such as the type, protocol, and identification number of the local device 6 together with the insertion state.

The device driver 18 notifies the OS 16 of the sleep permission (S12) to bring the OS 16 into the sleep state.

While the system host 2 and the adaptor 4 are in the sleep state, the local device 6 is removed from the adaptor 4 by the system operator or the like (S13*b*).

When the system host 2 and the adaptor 4 return from the sleep state, the OS 16 issues the start request to the device driver 18 (S14). The device driver 18 instructs, in response to the start request, the adaptor 4 to check the state of the card (local device) 6 (S16), and the adaptor 4 checks, in response to the instruction, whether or not the card (local device) 6 is inserted (S18).

As shown in the sequence diagram in FIG. 6, since no card (local device) 6 is inserted, the adaptor 4 determines that no card (local device) 6 is inserted (S20). The adaptor 4 returns, to the device driver 18, a response indicating that no card (local device) 6 is inserted (S22).

Here, the device driver 18 determines that the state of the card (local device) 6 in the adaptor 4 has changed from the insertion state to the non-insertion state based on the contents stored in the pre-sleep state storage 17 and the contents of the response from the adaptor 4. The device driver 18 provides, to the service 11, notification of the change from the insertion state to the non-insertion state of the card (local device) 6 (S24). Note that this "notification of the change from the insertion state to the non-insertion state" is typically provided to respond to polling made by the service 11.

In response to the "notification of the change from the insertion state to the non-insertion state", the service 11 issues the reload request to the OS 16 to reload the device driver 18 (S26).

In response to the reload request to reload the device driver 18, the OS 16 first unloads the current device driver 18 initialized for the adaptor 4 having the local device 6 inserted (S28), and the OS 16 is noticed of the completion of the unloading (S30). Subsequently, the OS 16 loads the device driver 18 initialized for the adaptor 4 having no local device 6 inserted (S32). The device driver 18 thus loaded initializes the drive (adaptor) 4 (S34).

Since no local device 6 is inserted into the adaptor 4, the adaptor 4 performs neither an initialization process on the local device 6 in the adaptor 4 (see S36) nor the response process (that is, an initialization completion notification process) (see S38).

The completion of the initialization of the adaptor 4 is notified to the device driver 18 (S40).

2.3. Effects and Others

As described above, according to the present embodiment, the data transfer system includes the system host 2 and the adaptor 4 including the local host 10. The adaptor 4 is connectable to the local device 6 inserted into the adaptor 4. The adaptor 4 includes the switch unit 8 that performs address translation and Requestor (Req) ID translation for data transfers between the local device 6 and the system host 2. When the local device 6 is inserted or removed while the system host 2 is in operation, the system host 2 checks the type of the protocol applied to the local device 6 and reloads the device driver 18 based on a result of the check. The device driver 18 further includes the pre-sleep state storage 17 that stores the insertion and removal state of the local device 6 immediately before the system host 2 and the adaptor 4 enter the sleep state.

When the device driver 18 determines, upon the system host 2 and the adaptor 4 returning from the sleep state, that the state of the local device 6 has changed from the non-insertion state to the insertion state based on the contents stored in the pre-sleep state storage 17 and the contents of the response from the adaptor 4, the system host 2 reloads the device driver 18, and the device driver 18 thus reloaded initializes the inserted local device 6. Furthermore, when the device driver 18 determines, upon the system host 2 and the adaptor 4 returning from the sleep state, that the state of the local device 6 has changed from the insertion state to the non-insertion state based on the contents stored in the pre-sleep state storage 17 and the contents of the response from the adaptor 4, the system host 2 reloads the device driver 18, and the device driver 18 thus reloaded initializes the adaptor 4.

This allows, in the data transfer system according to the present embodiment, the system host 2 to suitably transmit and receive data to and from the local device 6 and/or the adaptor 4 after returning from the sleep state even when the insertion and removal state of the local device 6 with respect to the adaptor 4 changes while the system host 2 and the adaptor 4 are in the sleep state.

3. Second Embodiment

Next, a description will be given of a second embodiment with reference to FIGS. 1 to 4, 7, and 8.

3.1. Structure

A data transfer system according to the second embodiment is identical in structure to the data transfer system according to the first embodiment shown in FIGS. 1 to 4. Therefore, a system host in the data transfer system according to the second embodiment is also identical in structure to the system host in the data transfer system according to the first embodiment.

3.1.1. Technical Features of Data Transfer System According to Second Embodiment Also in the system host 2 according to the second embodiment, the OS 16, the applications 11, 15, the device driver 18, and the like are run on the CPU, and further, the device driver 18 includes the pre-sleep state storage 17. The pre-sleep state storage 17 stores the insertion and removal state of the local device 6 immediately before the system host 2 and the adaptor 4 enter the sleep state corresponding to the power saving mode. Here, in the system host 2 according to the second embodiment, when the insertion and removal state of the local device 6 has changed at the time when the system host 2 and the adaptor 4 return from the sleep state, the OS 16 calls an initialization function of the device driver 18. The initialization function thus called returns the device driver 18 to an initialization point. As described above, the system host 2 responds to a change in the insertion and removal state of the local device 6.

3.2. Operation

Figure 7:
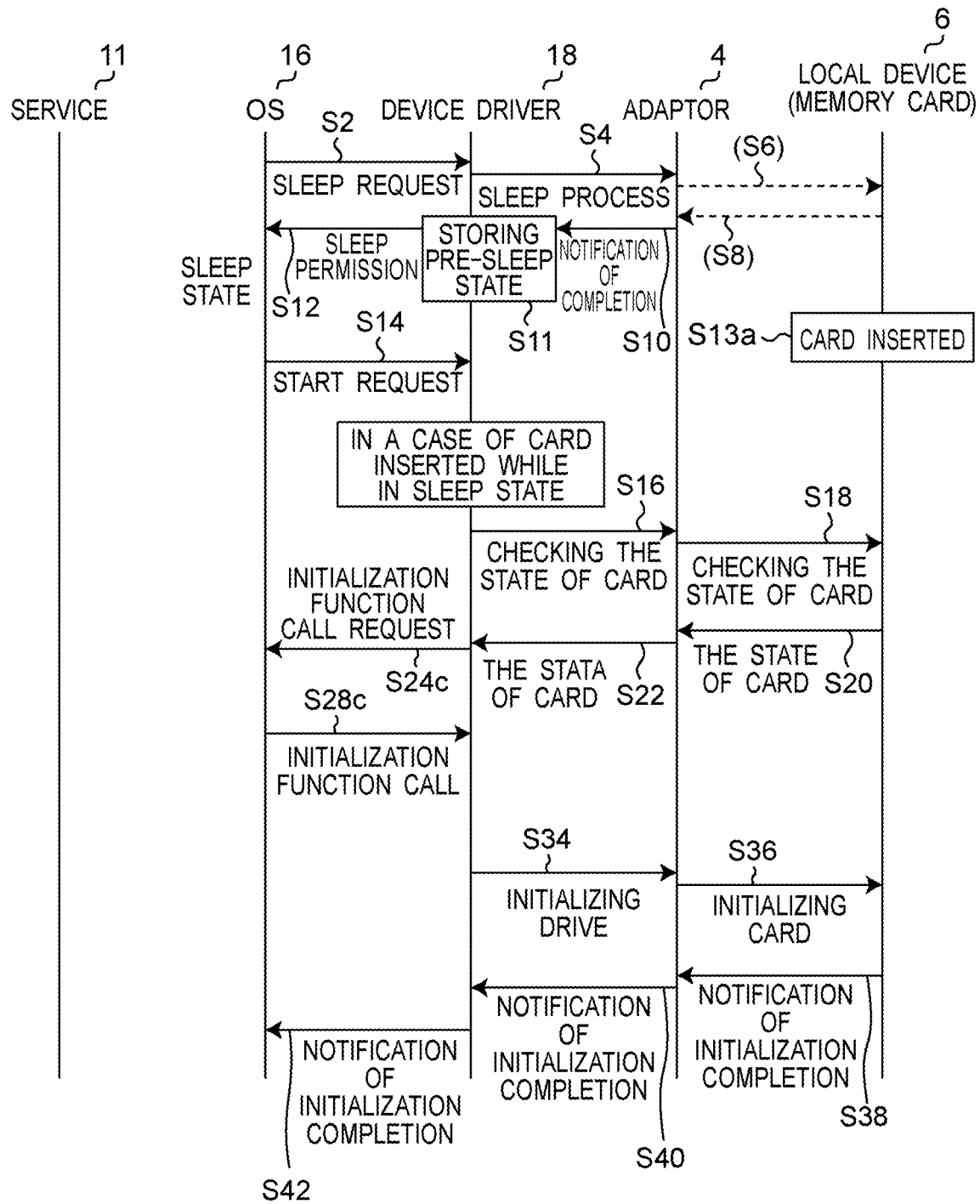
FIG. 7 is a third sequence diagram showing how a data transfer system according to a second embodiment operates.
Figure 8:
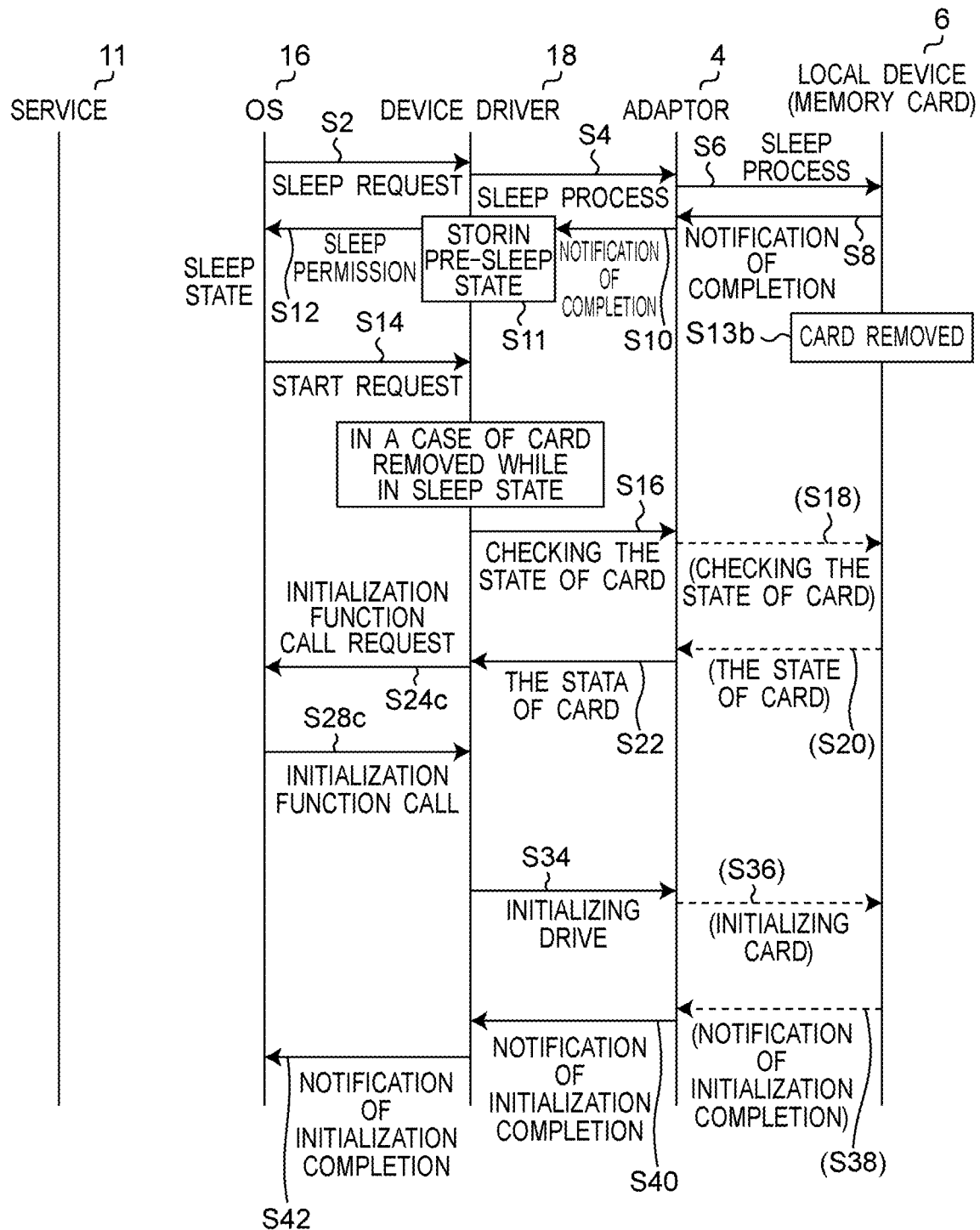
FIG. 8 is a fourth sequence diagram showing how the data transfer system according to the second embodiment operates.

FIGS. 7 and 8 are a third sequence diagram and a fourth sequence diagram, respectively, for specifically describing the operation of the data transfer system according to the second embodiment including the system host 2 using the device driver 18 including the pre-sleep state storage 17.

Also according to the second embodiment, the OS 16 and the device driver 18 reside in the system host 2.

3.2.1. Sequence when Local Device is Inserted in Sleep State

FIG. 7 is the third sequence diagram showing how the data transfer system according to the second embodiment operates when a change from the state where no local device 6 has been inserted into the adaptor 4 to the state where the local device 6 has been inserted into the adaptor 4 has occurred while the system host 2 and the adaptor 4 are in the sleep state.

A sequence from when the OS 16 issues the sleep request to the device driver 18 (S2) to when the adaptor 4 returns, to the device driver 18, the response indicating that the card (local device) is inserted (S22) is the same as in the first sequence diagram of FIG. 5 showing how the data transfer system according to the first embodiment operates.

Immediately after step S22, the device driver 18 determines that the state of the card (local device) 6 in the adaptor 4 has changed from the non-insertion state to the insertion state based on the contents stored in the pre-sleep state storage 17 and the contents of the response from the adaptor 4. Here, the device driver 18 issues an initialization function call request to the OS 16 (S24c). In response to this request, the OS 16 calls the initialization function of the device driver 18 (S28c).

The initialization function is also referred to as a callback function that is a function of the device driver 18 registered in advance with the OS 16. When the initialization function (callback function) is called, the device driver 18 returns to the initialization point.

In the third sequence shown in FIG. 7, the device driver 18 is initialized for the adaptor 4 having the local device 6 inserted when returning to the initialization point.

The device driver 18 that has returned to the initialization point and been initialized initializes the drive (adaptor) 4 (S34). Then, the adaptor 4 initializes the inserted card (local device) 6 (S36). The completion of the initialization of the card (local device) 6 is notified to the adaptor 4 (S38), and further, the completion of the initialization of the card (local device) 6 and the drive (adaptor) 4 is notified to the device driver 18 (S40). The completion of the initialization of the card (local device) 6 and the drive (adaptor) 4 is further notified to the OS 16 (S42).

3.2.2. Sequence when Local Device is Removed in Sleep State

FIG. 8 is the fourth sequence diagram showing how the data transfer system according to the second embodiment operates when a change from the state where the local device 6 has been inserted into the adaptor 4 to the state where no local device 6 has been inserted into the adaptor 4, that is, the local device 6 has been removed from the adaptor 4, has occurred while the system host 2 and the adaptor 4 are in the sleep state.

A sequence from when the OS 16 issues the sleep request to the device driver 18 (S2) to when the adaptor 4 returns, to the device driver 18, the response indicating that no card (local device) is inserted (S22) is the same as in the second sequence diagram of FIG. 6 showing how the data transfer system according to the first embodiment operates.

Immediately after step S22, the device driver 18 determines that the state of the card (local device) 6 in the adaptor 4 has changed from the insertion state to the non-insertion state based on the contents stored in the pre-sleep state storage 17 and the contents of the response from the adaptor 4. Here, the device driver 18 issues the initialization function call request to the OS 16 (S24c). In response to this request, the OS 16 calls the initialization function of the device driver 18 (S28c).

The initialization function is the same as described above and is specifically the same as in the third sequence diagram of FIG. 7 showing how the data transfer system according to the second embodiment operates.

In the fourth sequence shown in FIG. 8, the device driver 18 is initialized for the adaptor 4 having no local device 6 inserted when returning to the initialization point. The device driver 18 that has returned to the initialization point and been initialized initializes the drive (adaptor) 4 (S34).

Since no local device 6 is inserted into the adaptor 4, the adaptor 4 performs neither the initialization process on the local device 6 in the adaptor 4 (see S36) nor the response process (that is, the initialization completion notification process) (see S38).

The completion of the initialization of the adaptor 4 is notified to the device driver 18 (S40). The completion of the initialization of the adaptor 4 is further notified to the OS 16 (S42).

3.3. Effects and Others

As described above, according to the present embodiment, the data transfer system includes the system host 2 and the adaptor 4 including the local host 10. The adaptor 4 is connectable to the local device 6 inserted into the adaptor 4. The adaptor 4 includes the switch unit 8 that performs address translation and Requestor (Reg) ID translation for data transfers between the local device 6 and the system host 2. The device driver 18 in the system host 2 responsible for controlling the adaptor 4 and the local device 6 includes the pre-sleep state storage 17 that stores the insertion and removal state of the local device 6 immediately before the system host 2 and the adaptor 4 enter the sleep state.

Furthermore, the device driver 18 may determine, upon the system host 2 and the adaptor 4 returning from the sleep state, that the state of the local device 6 has changed from the non-insertion state to the insertion state based on the contents stored in the pre-sleep state storage 17 and the contents of the response from the adaptor 4. In this case, the system host 2 returns the device driver 18 to the initialization point of the device driver 18 and causes the device driver 18 that has returned to the initialization point to initialize the inserted local device 6.

Further, the device driver 18 may determine, upon the system host 2 and the adaptor 4 returning from the sleep state, that the state of the local device 6 has changed from the insertion state to the non-insertion state based on the contents stored in the pre-sleep state storage 17 and the contents of the response from the adaptor 4. In this case, the system host 2 returns the device driver 18 to the initialization point of the device driver 18 and causes the device driver 18 that has returned to the initialization point to initialize the adaptor 4.

This allows, in the data transfer system according to the present embodiment, the system host 2 to suitably transmit and receive data to and from the local device 6 and/or the adaptor 4 after returning from the sleep state even when the insertion and removal state of the local device 6 with respect to the adaptor 4 changes while the system host 2 and the adaptor 4 are in the sleep state.

As described above, the data transfer system according to the second embodiment has an action effect of allowing the system host 2 to suitably transmit and receive data to and from the local device 6 and/or the adaptor 4. This action effect is achieved on condition that the system host 2 and the adaptor 4 pass through the sleep state, and the insertion and removal state of the local device 6 with respect to adaptor 4 changes while the system host 2 and the adaptor 4 are in the sleep state.

In the data transfer system, as in the present embodiment, when the device driver 18 itself can issue the initialization function call request, and the OS 16 can call the initialization function in response to the request, it can be said that the service 11 is essentially unnecessary. In such a data transfer system, regardless of whether the system host 2 and the adaptor 4 pass through the sleep state, whenever the insertion and removal state of the local device 6 with respect to the adaptor 4 changes, the device driver 18 can issue, to the OS 16, the request to initialize the device driver 18, the drive (adaptor) 4, and the card (local device) 6 to allow the OS 16 to perform the initialization.

4. Third Embodiment

Next, a description will be given of a third embodiment with reference to FIGS. 1 to 4, 9, and 10.

4.1. Structure

A data transfer system according to the third embodiment is also identical in structure to the data transfer system according to the first embodiment shown in FIGS. 1 to 4. Therefore, a system host in the data transfer system according to the third embodiment is also identical in structure to the system host in the data transfer system according to the first embodiment.

4.1.1. Technical Features of Data Transfer System According to Third Embodiment Also in the system host 2 according to the third embodiment, the OS 16, the applications 11, 15, the device driver 18, and the like are run on the CPU, and further, the device driver 18 includes the pre-sleep state storage 17. The pre-sleep state storage 17 stores the insertion and removal state of the local device 6 immediately before the system host 2 and the adaptor 4 enter the sleep state corresponding to the power saving mode. Here, the system host 2 according to the third embodiment deletes the device driver 18 and loads the device driver 18 when the system host 2 and the adaptor 4 return from the sleep state.

4.2. Operation

Figure 9:
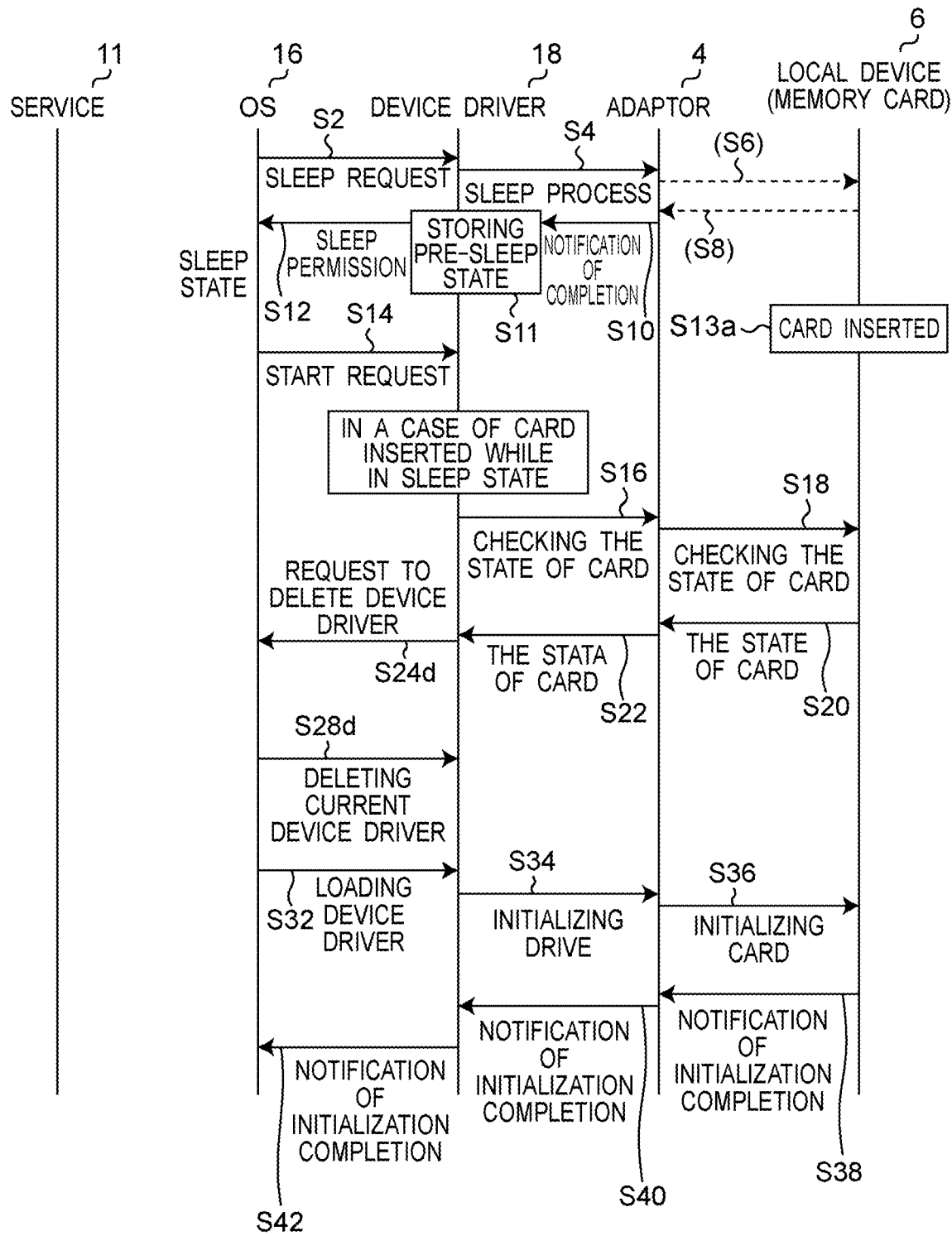
FIG. 9 is a fifth sequence diagram showing how a data transfer system according to a third embodiment operates.
Figure 10:
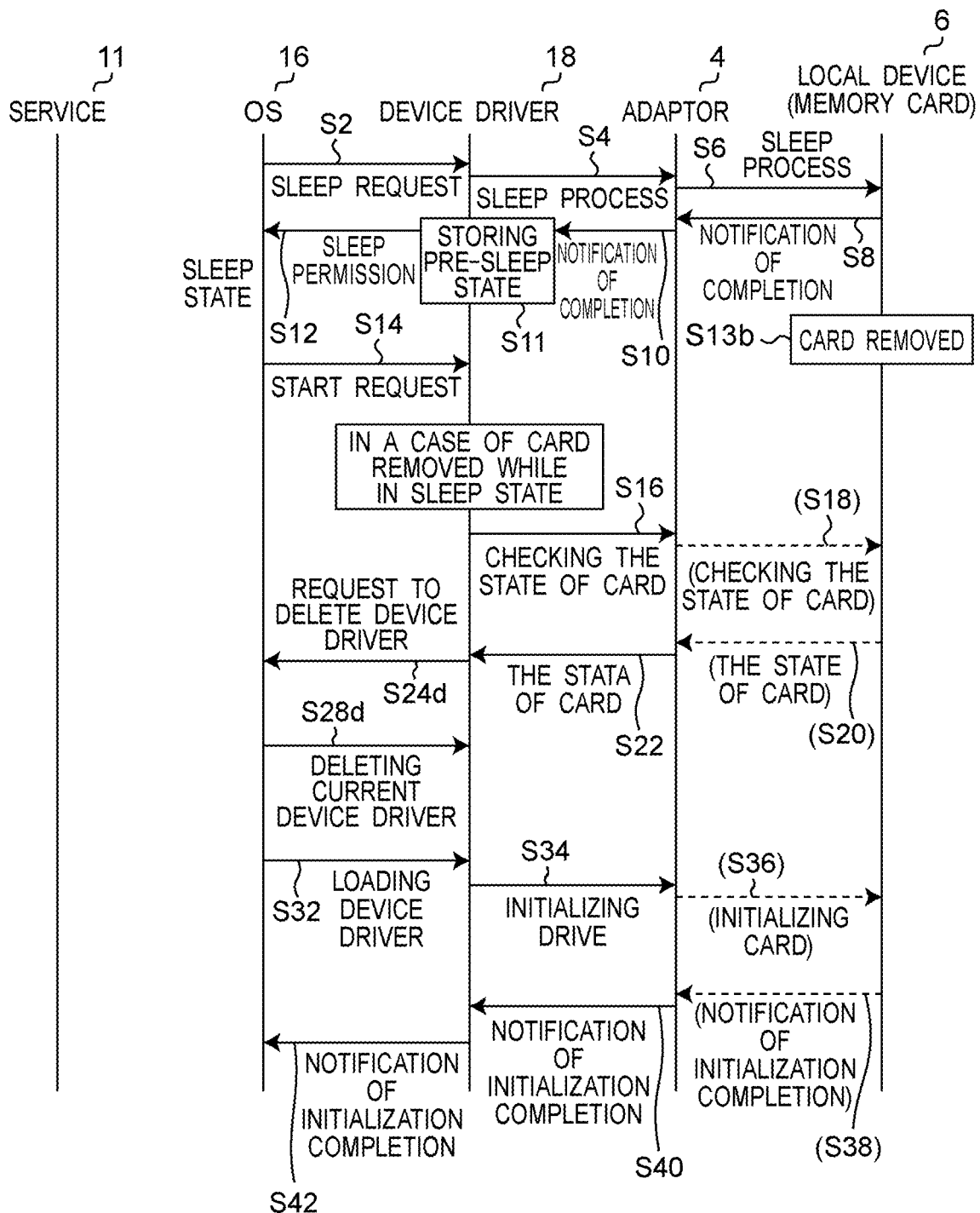
FIG. 10 is a sixth sequence diagram showing how the data transfer system according to the third embodiment operates.

FIGS. 9 and 10 are a fifth sequence diagram and a sixth sequence diagram, respectively, for specifically describing the operation of the data transfer system according to the third embodiment including the system host 2 using the device driver 18 including the pre-sleep state storage 17.

Also according to the third embodiment, the OS 16 and the device driver 18 reside in the system host 2.

4.2.1. Sequence when Local Device is Inserted in Sleep State

FIG. 9 is the fifth sequence diagram showing how the data transfer system according to the third embodiment operates when a change from the state where no local device 6 has been inserted into the adaptor 4 to the state where the local device 6 has been inserted into the adaptor 4 has occurred while the system host 2 and the adaptor 4 are in the sleep state.

A sequence from when the OS 16 issues the sleep request to the device driver 18 (S2) to when the adaptor 4 returns, to the device driver 18, the response indicating that the card (local device) is inserted (S22) is the same as in the first sequence diagram of FIG. 5 showing how the data transfer system according to the first embodiment operates.

Immediately after step S22, the device driver 18 determines that the state of the card (local device) 6 in the adaptor 4 has changed from the non-insertion state to the insertion state based on the contents stored in the pre-sleep state storage 17 and the contents of the response from the adaptor 4. Here, the device driver 18 issues, to the OS 16, a request to delete the device driver 18 itself (S24*d*). In response to this request, the OS 16 deletes the current device driver 18 initialized for the adaptor 4 having no local device 6 inserted (S28*d*).

Immediately after the deletion, the OS 16 loads the device driver 18 initialized for the adaptor 4 having the local device 6 inserted (S32). The device driver 18 thus loaded initializes the drive (adaptor) 4 (S34). Then, the adaptor 4 initializes the inserted card (local device) 6 (S36). The completion of the initialization of the card (local device) 6 is notified to the adaptor 4 (S38), and further, the completion of the initialization of the card (local device) 6 and the drive (adaptor) 4 is notified to the device driver 18 (S40). The completion of the initialization of the card (local device) 6 and the drive (adaptor) 4 is further notified to the OS 16 (S42).

4.2.2. Sequence when Local Device is Removed in Sleep State

FIG. 10 is the sixth sequence diagram showing how the data transfer system according to the third embodiment operates when a change from the state where the local device 6 has been inserted into the adaptor 4 to the state where no local device 6 has been inserted into the adaptor 4, that is, the local device 6 has been removed from the adaptor 4, has occurred while the system host 2 and the adaptor 4 are in the sleep state.

A sequence from when the OS 16 issues the sleep request to the device driver 18 (S2) to when the adaptor 4 returns, to the device driver 18, the response indicating that no card (local device) is inserted (S22) is the same as in the second sequence diagram of FIG. 6 showing how the data transfer system according to the first embodiment operates.

Immediately after step S22, the device driver 18 determines that the state of the card (local device) 6 in the adaptor 4 has changed from the insertion state to the non-insertion state based on the contents stored in the pre-sleep state storage 17 and the contents of the response from the adaptor 4. Here, the device driver 18 issues, to the OS 16, the request to delete the device driver 18 itself (S24*d*). In response to this request, the OS 16 deletes the current device driver 18 initialized for the adaptor 4 having the local device 6 inserted (S28*d*).

Immediately after the deletion, the OS 16 loads the device driver 18 initialized for the adaptor 4 having no local device 6 inserted (S32). The device driver 18 thus loaded initializes the drive (adaptor) 4 (S34).

Since no local device 6 is inserted into the adaptor 4, the adaptor 4 performs neither the initialization process on the local device 6 in the adaptor 4 (see S36) nor the response process (that is, the initialization completion notification process) (see S38).

The completion of the initialization of the adaptor 4 is notified to the device driver 18 (S40). The completion of the initialization of the adaptor 4 is further notified to the OS 16 (S42).

4.3. Effects and Others

As described above, according to the present embodiment, the data transfer system includes the system host 2 and the adaptor 4 including the local host 10. The adaptor 4 is connectable to the local device 6 inserted into the adaptor 4. The adaptor 4 includes the switch unit 8 that performs address translation and Requestor (Req) ID translation for data transfers between the local device 6 and the system host 2. The device driver 18 in the system host 2 responsible for controlling the adaptor 4 and the local device 6 includes the pre-sleep state storage 17 that stores the insertion and removal state of the local device 6 immediately before the system host 2 and the adaptor 4 enter the sleep state.

Furthermore, the device driver 18 may determine, upon the system host 2 and the adaptor 4 returning from the sleep state, that the state of the local device 6 has changed from the non-insertion state to the insertion state based on the contents stored in the pre-sleep state storage 17 and the contents of the response from the adaptor 4. In this case, the system host 2 deletes the device driver 18 in response to the request to delete the device driver 18, loads the device driver 18 immediately after the deletion, and causes the device driver 18 thus loaded to initialize the inserted local device 6.

Further, the device driver 18 may determine, upon the system host 2 and the adaptor 4 returning from the sleep state, that the state of the local device 6 has changed from the insertion state to the non-insertion state based on the contents stored in the pre-sleep state storage 17 and the contents of the response from the adaptor 4. In this case, the system host 2 deletes the device driver 18 in response to the request to delete the device driver 18, loads the device driver 18 immediately after the deletion, and causes the device driver 18 thus loaded to initialize the adaptor 4.

This allows, in the data transfer system according to the present embodiment, the system host 2 to suitably transmit and receive data to and from the local device 6 and/or the adaptor 4 after returning from the sleep state even when the insertion and removal state of the local device 6 with respect to the adaptor 4 changes while the system host 2 and the adaptor 4 are in the sleep state.

As described above, the data transfer system according to the third embodiment also has an action effect of allowing the system host 2 to suitably transmit and receive data to and from the local device 6 or the adaptor 4. This action effect is achieved on condition that the system host 2 and the adaptor 4 pass through the sleep state, and the insertion and removal state of the local device 6 with respect to adaptor 4 changes while the system host 2 and the adaptor 4 are in the sleep state.

In the data transfer system, as in the present embodiment, when the device driver 18 can issue the request to delete the device driver 18 itself, and the OS 16 can delete the device driver 18 in response to the request and further load a new device driver 18, it can be said that the service 11 is essentially unnecessary. In such a data transfer system, regardless of whether the system host 2 and the adaptor 4 pass through the sleep state, whenever the insertion and removal state of the local device 6 with respect to the adaptor 4 changes, the device driver 18 can issue, to the OS 16, the request to delete the device driver 18 itself. Furthermore, the OS 16 can delete the device driver 18 and load a new device driver 18 to be initialized in accordance with the insertion and removal state of the local device 6 with respect to the adaptor 4.

5. Fourth Embodiment

Next, a description will be given of a fourth embodiment with reference to FIGS. 1 to 4, 11, and 12.

5.1. Structure

A data transfer system according to the fourth embodiment is also identical in structure to the data transfer system according to the first embodiment shown in FIGS. 1 to 4. Therefore, a system host in the data transfer system according to the fourth embodiment is also identical in structure to the system host in the data transfer system according to the first embodiment.

5.1.1. Technical Features of Data Transfer System According to Fourth Embodiment Also in the system host 2 according to the fourth embodiment, the OS 16, the applications 11, 15, the device driver 18, and the like are run on the CPU, and further, the device driver 18 includes the pre-sleep state storage 17. The pre-sleep state storage 17 stores the insertion and removal state of the local device 6 immediately before the system host 2 and the adaptor 4 enter the sleep state corresponding to the power saving mode. Here, in the system host 2 according to the fourth embodiment, when the insertion and removal state of the local device 6 has changed at the time when the system host 2 and the adaptor 4 return from the sleep state, the OS 16, the adaptor 4, and the card (local device) 6 update (change) their respective predetermined parameters in response to a request from the device driver 18. As described above, the system host 2 responds to a change in the insertion and removal state of the local device 6.

5.2. Operation

Figure 11:
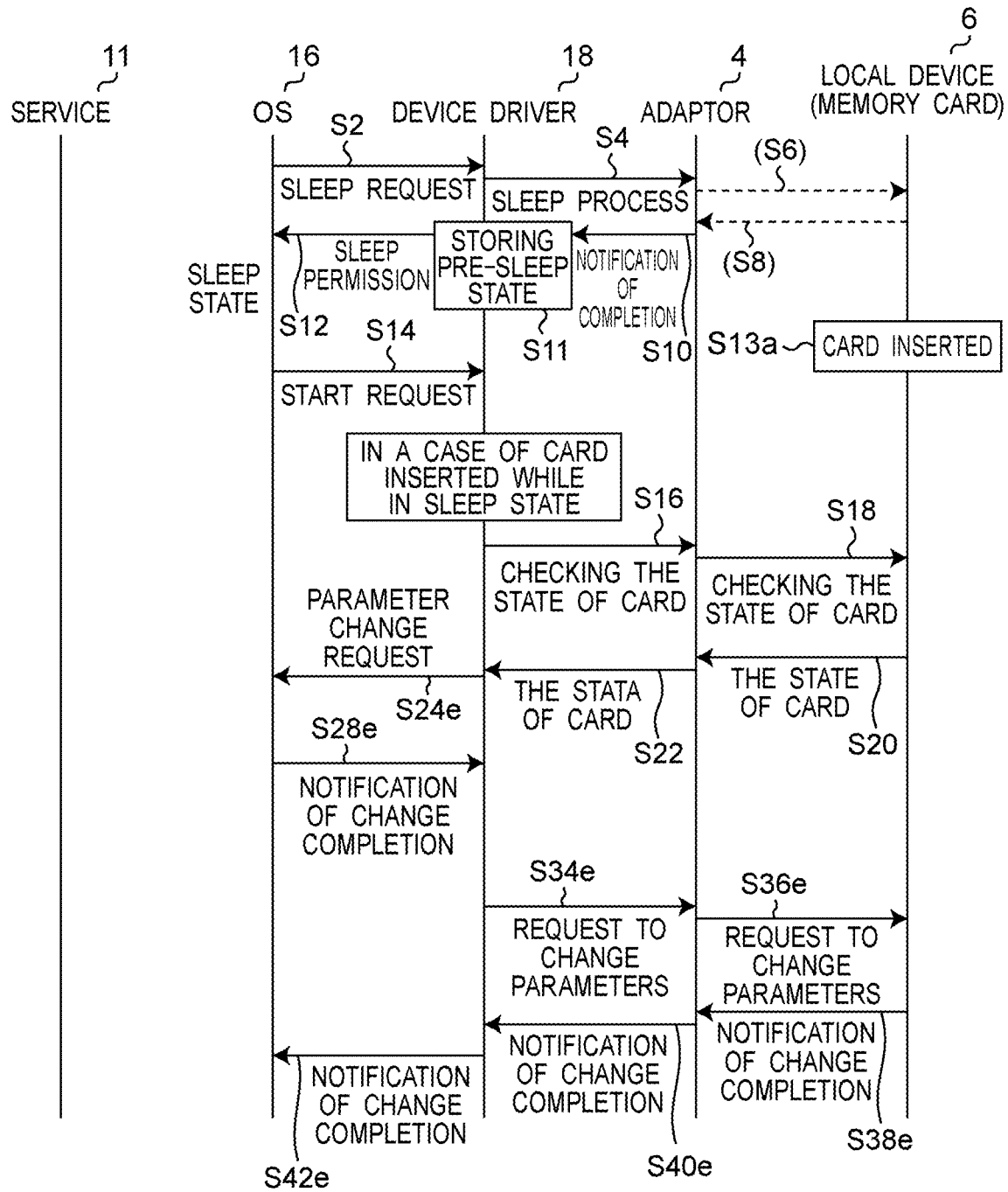
FIG. 11 is a seventh sequence diagram showing how a data transfer system according to a fourth embodiment operates.
Figure 12:
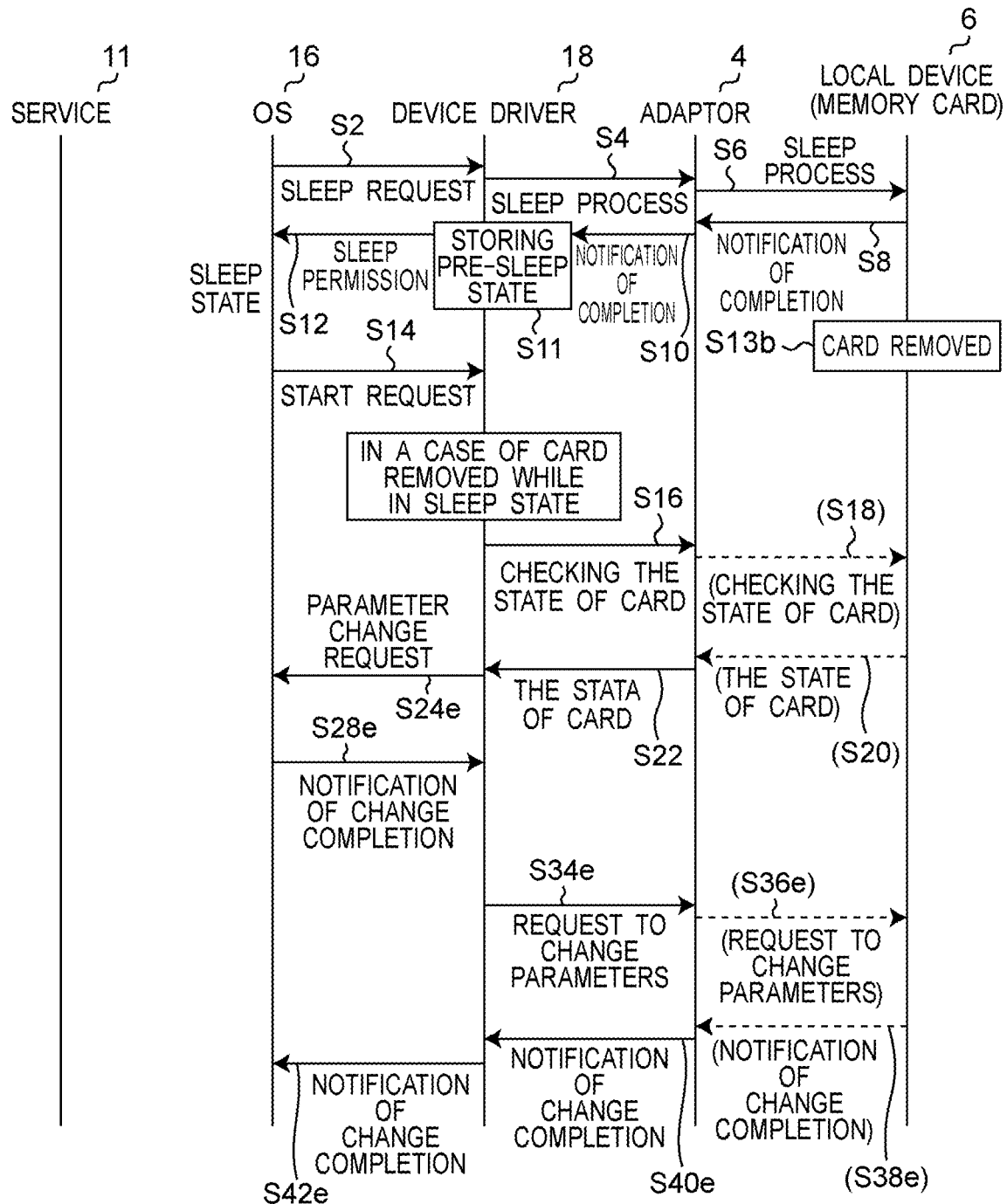
FIG. 12 is an eighth sequence diagram showing how the data transfer system according to the fourth embodiment operates.

FIGS. 11 and 12 are a seventh sequence diagram and an eighth sequence diagram, respectively, for specifically describing the operation of the data transfer system according to the fourth embodiment including the system host 2 using the device driver 18 including the pre-sleep state storage 17.

Also according to the fourth embodiment, the OS 16 and the device driver 18 reside in the system host 2.

5.2.1. Sequence when Local Device is Inserted in Sleep State

FIG. 11 is the seventh sequence diagram showing how the data transfer system according to the fourth embodiment operates when a change from the state where no local device 6 has been inserted into the adaptor 4 to the state where the local device 6 has been inserted into the adaptor 4 has occurred while the system host 2 and the adaptor 4 are in the sleep state.

A sequence from when the OS 16 issues the sleep request to the device driver 18 (S2) to when the adaptor 4 returns, to the device driver 18, the response indicating that the card (local device) is inserted (S22) is the same as in the first sequence diagram of FIG. 5 showing how the data transfer system according to the first embodiment operates.

Immediately after step S22, the device driver 18 determines that the state of the card (local device) 6 in the adaptor 4 has changed from the non-insertion state to the insertion state based on the contents stored in the pre-sleep state storage 17 and the contents of the response from the adaptor 4. Here, the device driver 18 issues a parameter change request to the OS 16 (S24e). In response to this request, the OS 16 changes the predetermined parameters and notifies the device driver 18 of the completion of the change (S28e).

The parameters are changed in order to adapt to a change in the insertion and removal state of the card (local device) 6. That is, the predetermined parameters are changed in accordance with the insertion and removal state of the card (local device) 6. The predetermined parameters relate to, for example, "number of command queues", "command queue depth", "transfer command size", and "attribute of transfer list".

The above-described parameters have the following meanings.

TABLE 1

Number of command queues

This parameter represents the number of queues that are used for queuing a plurality of requests to be processed and can be subjected to parallel processing.
An object of this parameter is to make a command processing time shorter to increase a read/write speed.
Command queue depth This parameter represents the number of commands that can be queued for each command queue.
Transfer command size This parameter represents the maximum size of data that can be transferred for each data transfer command.
Attribute of transfer list The "transfer list" is a list of transfer blocks for use in transferring data to transfer blocks that reside in discontiguous physical memory in a system host using a virtual memory.
The "attribute" includes "type" and "area" (of the transfer list).
The "type" represents which format among a plurality of formats a list has.
The "area" represents an address and size of an area to which the transfer list is placed.

Note that the parameters are not limited to the above-described parameters, and another parameter may be added.

In the seventh sequence shown in FIG. 11, the OS 16 changes the predetermined parameters in accordance with the state where the local device 6 is inserted. Further, in response to a parameter change completion notification from the OS 16 (S28e), the device driver 18 issues, to the adaptor 4, a request to change the predetermined parameters in accordance with the state where the local device 6 is inserted (S34e). In response to this request, the adaptor 4 changes the predetermined parameters and then issues, to the inserted card (local device) 6, a request to change the predetermined parameters (S36e). In response to this request, the card (local device) 6 changes the predetermined parameters.

The completion of the change of the predetermined parameters in the card (local device) 6 is notified to the adaptor 4 (S38e). Further, the completion of the change of the predetermined parameters in the card (local device) 6 and the drive (adaptor) 4 is notified to the device driver 18 (S40e). The completion of the change of the predetermined parameters in the card (local device) 6 and the drive (adaptor) 4 is further notified to the OS 16 (S42e).

5.2.2. Sequence when Local Device is Removed in Sleep State

FIG. 12 is the eighth sequence diagram showing how the data transfer system according to the fourth embodiment operates when a change from the state where the local device 6 has been inserted into the adaptor 4 to the state where no local device 6 has been inserted into the adaptor 4, that is, the local device 6 has been removed from the adaptor 4, has occurred while the system host 2 and the adaptor 4 are in the sleep state.

A sequence from when the OS 16 issues the sleep request to the device driver 18 (S2) to when the adaptor 4 returns, to the device driver 18, the response indicating that no card (local device) is inserted (S22) is the same as in the second sequence diagram of FIG. 6 showing how the data transfer system according to the first embodiment operates.

Immediately after step S22, the device driver 18 determines that the state of the card (local device) 6 in the adaptor 4 has changed from the insertion state to the non-insertion state based on the contents stored in the pre-sleep state storage 17 and the contents of the response from the adaptor 4. Here, the device driver 18 issues the parameter change request to the OS 16 (S24e). In response to this request, the OS 16 changes the predetermined parameters and notifies the device driver 18 of the completion of the change (S28e).

The predetermined parameters and their changes are as described above (see Table 1).

In the eighth sequence shown in FIG. 12, the OS 16 changes the predetermined parameters in accordance with the state where no local device 6 is inserted. Further, in response to the parameter change completion notification from the OS 16 (S28e), the device driver 18 issues, to the adaptor 4, the request to change the predetermined parameters in accordance with the state where no local device 6 is inserted (S34e). In response to this request, the adaptor 4 changes the predetermined parameters.

Since no local device 6 is inserted into the adaptor 4, the adaptor 4 does not issue, to the local device 6, the request to change the predetermined parameters (see S36e). This in turn prevents the completion of the change of the predetermined parameters in the local device 6 from being notified to the adaptor 4 (see S38e).

The completion of the change of the predetermined parameters in the drive (adaptor) 4 is notified to the device driver 18 (S40e). The completion of the change of the predetermined parameters in the drive (adaptor) 4 is further notified to the OS 16 (S42e).

5.3. Effects and Others

As described above, according to the present embodiment, the data transfer system includes the system host 2 and the adaptor 4 including the local host 10. The adaptor 4 is connectable to the local device 6 inserted into the adaptor 4. The adaptor 4 includes the switch unit 8 that performs address translation and Requestor (Req) ID translation for data transfers between the local device 6 and the system host 2. The device driver 18 in the system host 2 responsible for controlling the adaptor 4 and the local device 6 includes the pre-sleep state storage 17 that stores the insertion and removal state of the local device 6 immediately before the system host 2 and the adaptor 4 enter the sleep state.

Furthermore, the device driver 18 may determine, upon the system host 2 and the adaptor 4 returning from the sleep state, that the state of the local device 6 has changed from the non-insertion state to the insertion state based on the contents stored in the pre-sleep state storage 17 and the contents of the response from the adaptor 4. In this case, the system host 2 changes the respective predetermined parameters of the operating system 16, the adaptor 4, and the local device 6 in accordance with the state where the local device 6 is inserted into the adaptor 4.

Further, the device driver 18 may determine, upon the system host 2 and the adaptor 4 returning from the sleep state, that the state of the local device 6 has changed from the insertion state to the non-insertion state based on the contents stored in the pre-sleep state storage 17 and the contents of the response from the adaptor 4. In this case, the system host 2 changes the respective predetermined parameters of the operating system 16 and the adaptor 4 in accordance with the state where no local device 6 is inserted into the adaptor 4.

This allows, in the data transfer system according to the present embodiment, the system host 2 to suitably transmit and receive data to and from the local device 6 and/or the adaptor 4 after returning from the sleep state even when the insertion and removal state of the local device 6 with respect to the adaptor 4 changes while the system host 2 and the adaptor 4 are in the sleep state.

As described above, the data transfer system according to the fourth embodiment also has an action effect of allowing the system host 2 to suitably transmit and receive data to and from the local device 6 and/or the adaptor 4. This action effect is achieved on condition that the system host 2 and the adaptor 4 pass through the sleep state, and the insertion and removal state of the local device 6 with respect to adaptor 4 changes while the system host 2 and the adaptor 4 are in the sleep state.

In the data transfer system, in order to adapt to the change in the insertion and removal state of the card (local device) 6 with the system host 2 and the adaptor 4 passing through the sleep state, when the device driver 18 itself can issue the request to change the predetermined parameters, and the OS 16, the adaptor 4, and the card (local device) 6 can change their respective predetermined parameters in response to the request as in the present embodiment, it can be said that the service 11 is essentially unnecessary. In such a data transfer system, regardless of whether the system host 2 and the adaptor 4 pass through the sleep state, the device driver 18 can issue, to the OS 16, the request to change the respective predetermined parameters of the OS 16, the adaptor 4, and the card (local device) 6 in order to adapt to the change in the insertion and removal state of the card (local device) 6. In response to this request, the OS 16 can change the respective predetermined parameters of the OS 16, the adaptor 4, and the card (local device) 6.

6. Other Embodiments

As described above, the first to fourth embodiments have been described as examples of the technique disclosed in the present application. However, the technique according to the present disclosure is not limited to the embodiments and is applicable to embodiments in which changes, replacements, additions, omissions, or the like are made as appropriate.

According to the above-described first to fourth embodiments, the systems using PCIe have been described as examples, but the technique according to the above-described embodiments is applicable to also a system responsible for converting between PCIe and PCI, in an adaptor, for a local device including a PCI bus which is one of similar techniques, and further can bring about the same effects. The technique according to the above-described embodiments is further applicable to a system that conforms to the PCIe protocol, for example, a system that performs data transfers over a bus on which PCIe packets are logically transmitted and received and can bring about the same effects.

Furthermore, the examples where the above-described embodiments are applied to an adaptor have been described, but the adaptor (for example, an adaptor including the local host and the multi-function switch unit) is merely an example, and even when the adaptor is a card of an add-in type (for example, a card including a PCIe connector) that is directly inserted into the slot of the local bus (for example, a PCIe bus) of the system host, the technique according to the above-described embodiments is applicable and can bring about the same effects.

Further, the accompanying drawings and the detailed description have been provided in order to describe the embodiments. Consequently, the accompanying drawings and detailed description provided to illustrate the technique described above may include not only components that are essential for solving the problem but also components that are not essential for solving the problem. Thus, it should not be immediately deemed that, merely based on the fact that the components that are not essential are shown in the accompanying drawings and the detailed description, the components that are not essential are essential.

Further, since the above-described embodiments are provided to illustrate the technique according to the present disclosure, various changes, replacements, additions, omissions, or the like can be made within the scope of the claims or of their equivalents.

INDUSTRIAL APPLICABILITY

The present disclosure is applicable to an information processing apparatus to which a removable medium is attached. Specifically, the present disclosure is applicable to a video server or the like.

REFERENCE SIGNS LIST 2 system host
4 adaptor
6, 6A, 6B local device
8 multi-function switch unit
10 local host
11 service
12 slot
14, 14A, 14B non-volatile memory
15 application
16 operating system (OS)
17 pre-sleep state storage
18 device driver
20 memory
22 root complex
24 CPU
27 NT port (USP)
28 NT port (DSP)
30 event notification unit
38 insertion and removal detector
40 packet transfer unit
46 address translator
48 Requestor (Req) ID translator
50 PCIe switch
58 local controller
68 root complex
70 memory
76 command interpreter
78 data transfer unit
80 user layer
82 kernel layer
84 device layer

The invention claimed is:

1. A data transfer system comprising:
a system host; and
an adaptor including a local host,
wherein the adaptor is connectable to a local device inserted into the adaptor and includes a switch unit configured to perform address translation and Requestor (Req) ID translation for data transfers between the local device and the system host,
the system host checks, when the local device is inserted or removed while the system host is in operation, a type of a protocol applied to the local device and reloads a device driver based on a result of the check, and
the device driver includes a pre-sleep state storage configured to store an insertion and removal state of the local device immediately before the system host and the adaptor enter a sleep state.

2. The data transfer system according to claim 1, wherein
when the device driver determines, upon the system host and the adaptor returning from the sleep state, that the insertion and removal state of the local device has changed based on contents stored in the pre-sleep state storage and contents of a response from the adaptor, the system host reloads the device driver.

3. The data transfer system according to claim 1, wherein
when the device driver determines, upon the system host and the adaptor returning from the sleep state, that the state of the local device has changed from a non-insertion state to an insertion state based on contents stored in the pre-sleep state storage and contents of a response from the adaptor, the system host reloads the device driver and causes the device driver reloaded to initialize the local device inserted, and
when the device driver determines, upon the system host and the adaptor returning from the sleep state, that the state of the local device has changed from the insertion state to the non-insertion state based on the contents stored in the pre-sleep state storage and the contents of the response from the adaptor, the system host reloads the device driver and causes the device driver reloaded to initialize the adaptor.

4. A data transfer system comprising:
a system host; and
an adaptor including a local host,
wherein the adaptor is connectable to a local device inserted into the adaptor and includes a switch unit configured to perform address translation and Requestor (Req) ID translation for data transfers between the local device and the system host,
a device driver in the system host is configured to control the adaptor and the local device and includes a pre-sleep state storage configured to store an insertion and removal state of the local device immediately before the system host and the adaptor enter a sleep state,
when the device driver determines, upon the system host and the adaptor returning from the sleep state, that the state of the local device has changed from a non-insertion state to an insertion state based on contents stored in the pre-sleep state storage and contents of a response from the adaptor, the system host returns the device driver to an initialization point of the device driver and causes the device driver returned to the initialization point to initialize the local device inserted, and
when the device driver determines, upon the system host and the adaptor returning from the sleep state, that the state of the local device has changed from the insertion state to the non-insertion state based on the contents stored in the pre-sleep state storage and the contents of the response from the adaptor, the system host returns the device driver to the initialization point of the device driver and causes the device driver returned to the initialization point to initialize the adaptor.

5. A data transfer system comprising:
a system host; and
an adaptor including a local host,
wherein the adaptor is connectable to a local device inserted into the adaptor and includes a switch unit configured to perform address translation and Requestor (Req) ID translation for data transfers between the local device and the system host,
a device driver in the system host is configured to control the adaptor and the local device and includes a pre-sleep state storage configured to store an insertion and removal state of the local device immediately before the system host and the adaptor enter a sleep state,
when the device driver determines, upon the system host and the adaptor returning from the sleep state, that the state of the local device has changed from a non-insertion state to an insertion state based on contents stored in the pre-sleep state storage and contents of a response from the adaptor, the system host deletes the device driver in response to a request to delete the device driver, loads a device driver immediately after the deletion, and causes the device driver loaded to initialize the local device inserted, and
when the device driver determines, upon the system host and the adaptor returning from the sleep state, that the state of the local device has changed from the insertion state to the non-insertion state based on the contents stored in the pre-sleep state storage and the contents of the response from the adaptor, the system host deletes the device driver in response to the request to delete the device driver, loads a device driver immediately after the deletion, and causes the device driver loaded to initialize the adaptor.

6. A data transfer system comprising:
a system host; and
an adaptor including a local host,
wherein the adaptor is connectable to a local device inserted into the adaptor and includes a switch unit configured to perform address translation and Requestor (Req) ID translation for data transfers between the local device and the system host,
a device driver in the system host is configured to control the adaptor and the local device and includes a pre-sleep state storage configured to store an insertion and removal state of the local device immediately before the system host and the adaptor enter a sleep state,
when the device driver determines, upon the system host and the adaptor returning from the sleep state, that the state of the local device has changed from a non-insertion state to an insertion state based on contents stored in the pre-sleep state storage and contents of a response from the adaptor, the system host changes respective predetermined parameters of an operating system, the adaptor, and the local device in accordance with the insertion state where the local device is inserted into the adaptor, and
when the device driver determines, upon the system host and the adaptor returning from the sleep state, that the state of the local device has changed from the insertion state to the non-insertion state based on the contents stored in the pre-sleep state storage and the contents of the response from the adaptor, the system host changes the respective predetermined parameters of the operating system and the adaptor in accordance with the non-insertion state where the local device is not inserted into the adaptor.

7. A system host included in a data transfer system, the data transfer system further including an adaptor including a local host,
   wherein the adaptor is connectable to a local device inserted into the adaptor and includes a switch unit configured to perform address translation and Requestor (Req) ID translation for data transfers between the local device and the system host, and
   in the data transfer system where the system host checks, when the local device is inserted or removed while the system host is in operation, a type of a protocol applied to the local device and reloads a device driver based on a result of the check, the device driver includes a pre-sleep state storage configured to store an insertion and removal state of the local device immediately before the system host and the adaptor enter a sleep state.

8. The system host according to claim 7, configured to, when the device driver determines, upon the system host and the adaptor returning from the sleep state, that the insertion and removal state of the local device has changed based on contents stored in the pre-sleep state storage and contents of a response from the adaptor, reload the device driver.

9. The system host according to claim 7, configured to, when the device driver determines, upon the system host and the adaptor returning from the sleep state, that the state of the local device has changed from a non-insertion state to an insertion state based on contents stored in the pre-sleep state storage and contents of a response from the adaptor, reload the device driver and cause the device driver reloaded to initialize the local device inserted, and to, when the device driver determines, upon the system host and the adaptor returning from the sleep state, that the state of the local device has changed from the insertion state to the non-insertion state based on the contents stored in the pre-sleep state storage and the contents of the response from the adaptor, reload the device driver and cause the device driver reloaded to initialize the adaptor.

10. A system host included in a data transfer system, the data transfer system further including an adaptor including a local host,
    wherein in the data transfer system where the adaptor is connectable to a local device inserted into the adaptor and includes a switch unit configured to perform address translation and Requestor (Req) ID translation for data transfers between the local device and the system host,
    a device driver in the system host is configured to control the adaptor and the local device and includes a pre-sleep state storage configured to store an insertion and removal state of the local device immediately before the system host and the adaptor enter a sleep state,
    when the device driver determines, upon the system host and the adaptor returning from the sleep state, that the state of the local device has changed from a non-insertion state to an insertion state based on contents stored in the pre-sleep state storage and contents of a response from the adaptor, the system host returns the device driver to an initialization point of the device driver and causes the device driver returned to the initialization point to initialize the local device inserted, and
    when the device driver determines, upon the system host and the adaptor returning from the sleep state, that the state of the local device has changed from the insertion state to the non-insertion state based on the contents stored in the pre-sleep state storage and the contents of the response from the adaptor, the system host returns the device driver to the initialization point of the device driver and causes the device driver returned to the initialization point to initialize the adaptor.

11. A system host included in a data transfer system, the data transfer system further including an adaptor including a local host,
    wherein in the data transfer system where the adaptor is connectable to a local device inserted into the adaptor and includes a switch unit configured to perform address translation and Requestor (Req) ID translation for data transfers between the local device and the system host,
    a device driver in the system host is configured to control the adaptor and the local device and includes a pre-sleep state storage configured to store an insertion and removal state of the local device immediately before the system host and the adaptor enter a sleep state,
    when the device driver determines, upon the system host and the adaptor returning from the sleep state, that the state of the local device has changed from a non-insertion state to an insertion state based on contents stored in the pre-sleep state storage and contents of a response from the adaptor, the system host deletes the device driver in response to a request to delete the device driver, loads a device driver immediately after the deletion, and causes the device driver loaded to initialize the local device inserted, and
    when the device driver determines, upon the system host and the adaptor returning from the sleep state, that the state of the local device has changed from the insertion state to the non-insertion state based on the contents stored in the pre-sleep state storage and the contents of the response from the adaptor, the system host deletes the device driver in response to the request to delete the device driver, loads a device driver immediately after the deletion, and causes the device driver loaded to initialize the adaptor.

12. A system host included in a data transfer system, the data transfer system further including an adaptor including a local host,
    wherein in the data transfer system where the adaptor is connectable to a local device inserted into the adaptor and includes a switch unit configured to perform address translation and Requestor (Req) ID translation for data transfers between the local device and the system host,
    a device driver in the system host is configured to control the adaptor and the local device and includes a pre-sleep state storage configured to store an insertion and removal state of the local device immediately before the system host and the adaptor enter a sleep state,
    when the device driver determines, upon the system host and the adaptor returning from the sleep state, that the state of the local device has changed from a non-insertion state to an insertion state based on contents stored in the pre-sleep state storage and contents of a response from the adaptor, the system host changes respective predetermined parameters of an operating system, the adaptor, and the local device in accordance with the insertion state where the local device is inserted into the adaptor, and when the device driver determines, upon the system host and the adaptor returning from the sleep state, that the state of the local device has changed from the insertion state to the non-insertion state based on the contents stored in the pre-sleep state storage and the contents of the response from the adaptor, the system host changes the respective predetermined parameters of the operating system and the adaptor in accordance with the non-insertion state where the local device is not inserted into the adaptor.

* * * * *